United States Patent [19]
Sutton et al.

[11] Patent Number: 5,965,249
[45] Date of Patent: Oct. 12, 1999

[54] VIBRATION DAMPING COMPOSITE MATERIAL

[75] Inventors: Stephen P. Sutton, Elkton, Md.; Frank Principe, Landenberg, Pa.; Michele M. Gentile, Newark, Del.

[73] Assignee: Gore Enterprise Holdings, Inc., Newark, Del.

[21] Appl. No.: 08/908,619

[22] Filed: Aug. 7, 1997

[51] Int. Cl.$^6$ .................................................. B32B 5/18
[52] U.S. Cl. .............................. 428/304.4; 428/308.4; 428/317.9; 248/562; 248/636; 49/9
[58] Field of Search ........................ 428/304.4, 306.6, 428/308.4, 312.2, 317.9, 321.1, 322.7; 49/9; 248/562, 636

[56] References Cited

U.S. PATENT DOCUMENTS

| | | | |
|---|---|---|---|
| 4,128,138 | 12/1978 | Ishii et al. | 428/317.1 X |
| 4,304,694 | 12/1981 | Scola et al. | 260/18 EP |
| 4,374,172 | 2/1983 | Schwarz et al. | 428/308 |
| 4,488,282 | 12/1984 | Chung | 369/135 |
| 4,709,781 | 12/1987 | Scherzer | 428/317.9 X |
| 5,270,888 | 12/1993 | Collisson et al. | 360/103 |
| 5,331,062 | 7/1994 | Sorathia et al. | 525/454 |
| 5,368,916 | 11/1994 | Fujimoto et al. | 428/215 |
| 5,374,473 | 12/1994 | Knox et al. | 428/218 |
| 5,434,214 | 7/1995 | Wolosen et al. | 524/720 |
| 5,487,928 | 1/1996 | Fujimoto | 428/36.4 |
| 5,673,437 | 10/1997 | Chase et al. | 428/316.6 X |
| 5,712,038 | 1/1998 | Yamazaki et al. | 428/304.4 X |
| 5,761,184 | 6/1998 | Dauber et al. | |

FOREIGN PATENT DOCUMENTS 2011803 7/1979 United Kingdom .

*Primary Examiner*—Daniel Zirker
*Attorney, Agent, or Firm*—Gary A. Samuels

[57] ABSTRACT

A new composite damping material is presented which exhibits an enhanced ability to dampen mechanical oscillations. The enhanced damping properties of this material are achieved through the entrapment of highly viscous damping fluids within the pores of a porous material (such as: an expanded polymer, felt, foam, fabric, metal, etc.). The entrapment of the fluid within the porous scaffold prevents flow, providing a stable composite which may be shaped into useful articles. Such a construct allows utilization of the high performance damping properties of fluids which, in pure form, are too fluid-like for most practical applications (which typically require a solid, stable, material). This composite, possessing damping performance approaching that of certain fluids, combined with stability in a solid form, can be used in many applications where materials are needed to damp the vibration of mechanical systems. Such applications include, but are not limited to, damping of vibrations which produce noise or degrade performance in airplanes, automobiles, space structures, machine tools, sporting goods, disk drive components and assemblies, electrical/electronic components such as transformers, electrical cables, etc. In addition, these composites may be used to alter or tune the mechanical response of a variety of systems to produce desired impulse or vibrational response.

27 Claims, 33 Drawing Sheets

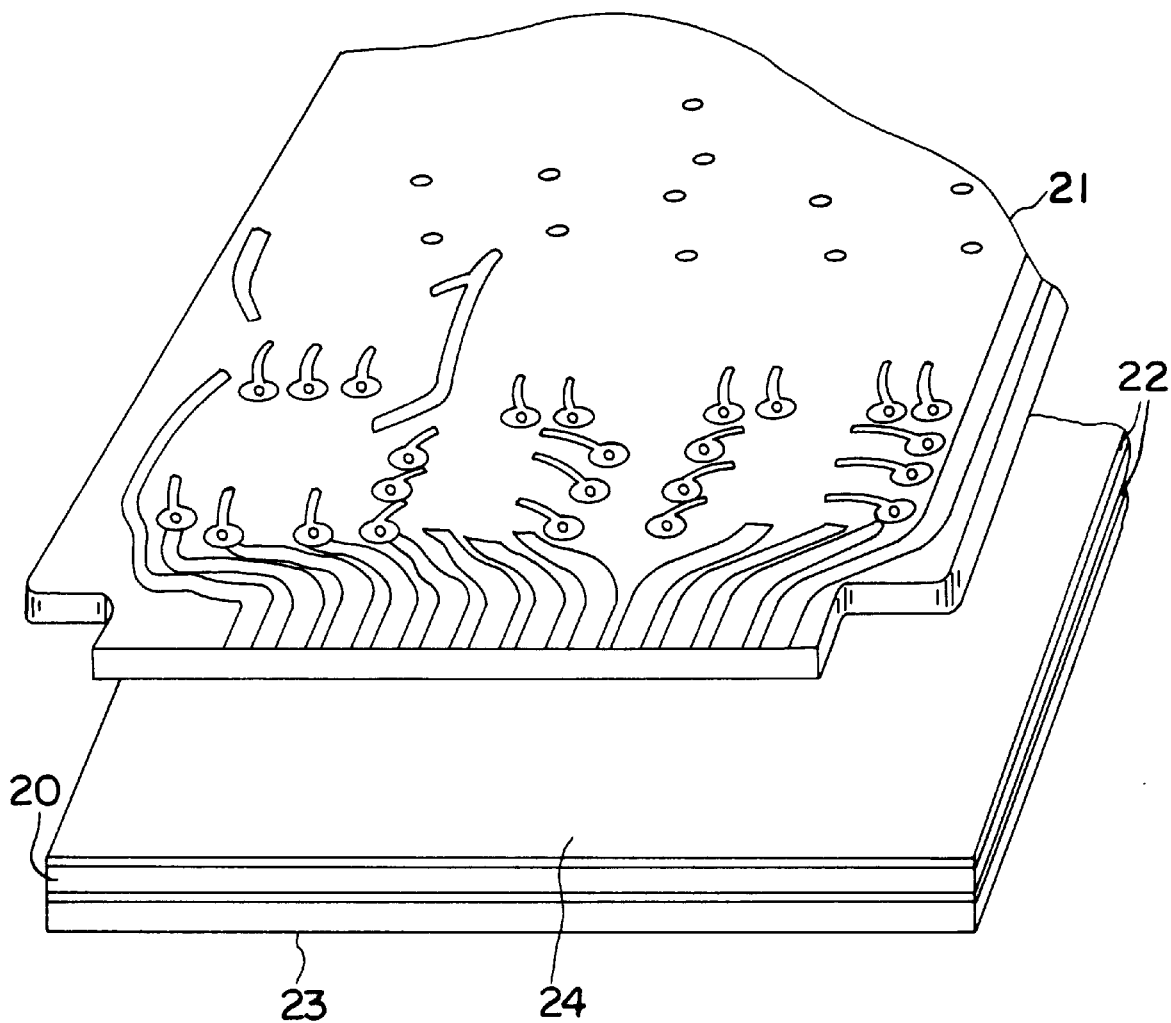
F I G. 6

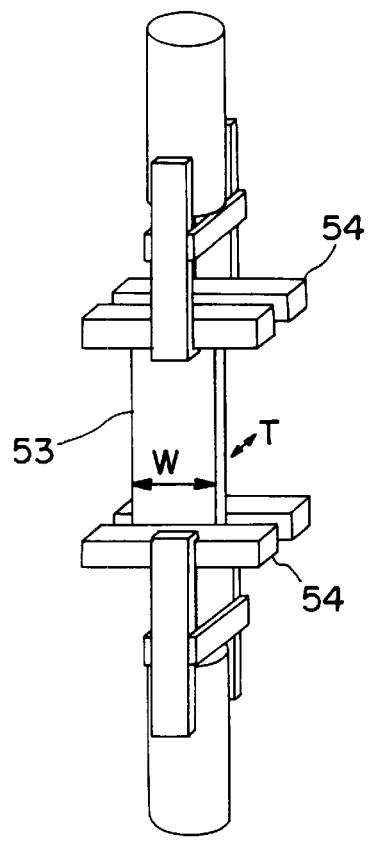
FIG. 15
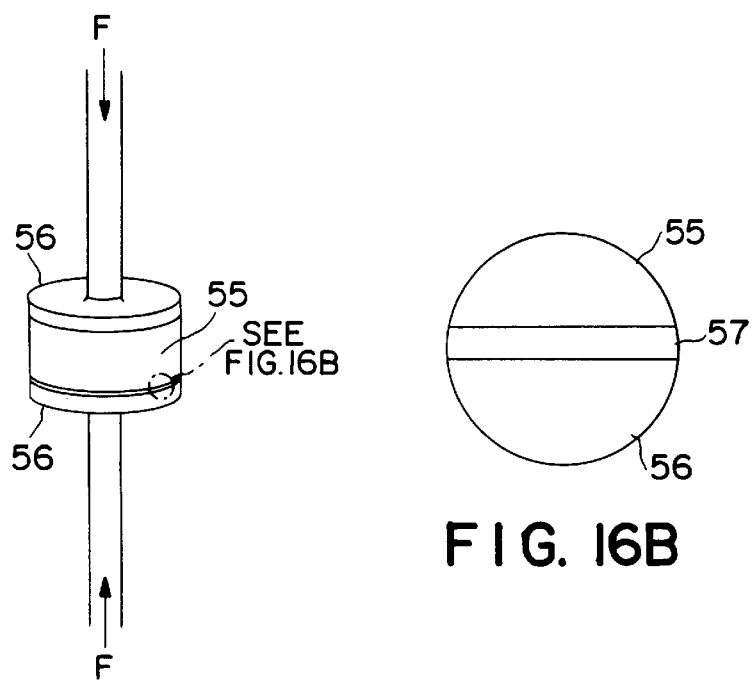
FIG. 16A
FIG. 16B

VIBRATION DAMPING COMPOSITE MATERIAL

FIELD OF THE INVENTION

The present invention relates to a vibration damping article comprised of two materials: 1) a porous scaffold providing mechanical stability and 2) a material which is mechanically unstable with respect to cold flow but which provides high viscous loss characteristics.

BACKGROUND OF THE INVENTION

Vibration damping is a common need in many mechanical systems where undesired resonances may be excited by normal perturbations. The suspension system in an automobile, for example, will exhibit large unwanted oscillations in response to road irregularities unless properly damped. A typical suspension system consists of large springs, coupled between the chassis and axles, which provide compliance as bumps are encountered. This allows the mass of the chassis to accelerate slowly in response to impulses. Shock absorbers, which produce forces opposing the velocity of compression or elongation of the springs, are employed to provide appropriate damping and inhibit oscillations.

The resonant frequency and size of automobile suspension systems allow the construction of shock absorbers which are often relatively complex mechanical contrivances (containing fluids, dynamic seals, etc.). Many systems, however, are better suited to the application of materials which inherently provide damping for oscillatory motions. Particularly where low amplitude and/or high frequency oscillations occur, it is desirable to directly couple materials with good damping properties to vibrating components.

Materials used for vibration damping should exhibit large viscous losses in response to deformation. These losses are typically quantified in terms of either dynamic Young's moduli or dynamic shear moduli. In either case, the dynamic storage modulus, by definition, is proportional to the amplitude of the stress which results in response to a sinusoidal strain (where the strain may be either shear or elongational depending on whether shear or Young's modulus is desired respectively). Similarly, the loss modulus is, by definition, proportional to the amplitude of the stress which results in response to the application of a sinusoidal strain rate. The ratio of dynamic shear loss modulus to dynamic shear storage modulus, or dynamic Young's loss modulus to dynamic Young's storage modulus, at a particular oscillation frequency, is commonly referred to as tan $\delta$. The magnitude of the loss modulus in a material quantifies its viscous-like resistance to deformation while tan $\delta$ quantifies the relative magnitude of this resistance to elastic response (McCrum et al., Anelastic and Dielectric in Polymeric Materials, John Wiley and Sons 1967).

Although damping performance may be characterized both in terms of tensile/compressive moduli and shear moduli, these two sets of moduli have a well defined relationship to one another. In particular, dynamic shear moduli are related to dynamic Young's moduli through a relationship which depends upon the Poisson ratio, which may also be frequency dependent. Because the relationship between Young's and shear moduli at a particular frequency is constrained to fall within relatively narrow limits, the two sets of moduli nearly always track each other in a monotonic fashion. It is therefore practical to quantify damping performance in terms of either dynamic shear or Young's moduli. For the sake of clarity, dynamic Young's moduli will be used for all discussion, analysis, and characterization to follow herein. In addition, the tan $\delta$ used subsequently herein will be defined as the ratio of the dynamic Young's loss modulus to the dynamic Young's storage modulus, at a given frequency, and all references to dynamic loss and storage moduli will refer to Young's Moduli.

The specific properties a damping material must possess are dictated by the constraints of typical applications. Damping materials, due to their unique mechanical properties, are not commonly used as structural materials but are incorporated into a system in combination with stiffer structural elements. For this reason, it is desirable to use the minimum possible amount of damping material in a given system such that the cost, volume, or mass of the damping component is minimized. This is particularly true in space, aircraft, or automotive applications (where weight is an important constraint) and in situations where the addition of damping components adds undesired mass affecting system response/performance (damping of vibrations in disk drive read/write heads, for example, requires low mass components which will not adversely affect the momentum of the head). For this reason, a purpose of this invention is to provide materials with the highest possible loss moduli, relative to the storage moduli of other materials comprising the system.

Constraints also exist on the ratio of dynamic loss moduli to dynamic storage moduli, tan $\delta$. Extremely stiff materials, even with large dynamic loss moduli, will be dominated by elastic effects and behave like springs. Large dynamic loss modulus, therefore, is not sufficient to ensure good damping characteristics at a particular frequency. It is also necessary that the ratio of dynamic loss to dynamic storage modulus be as large as possible, thus insuring sufficient loss relative to purely elastic behavior.

A number of approaches have been taken to achieve material properties sufficient for damping purposes. Specialized formulations of crosslinking polymers have been developed which exhibit damping in specific applications. Epoxy formulations have been developed for damping vibrations in magnetic recording heads, as disclosed in U.S. Pat. No. 5,270,888, and for damping in cutterhead assemblies used for the manufacture of high-density information discs, as disclosed in U.S. Pat. No. 4,488,282. Acrylic co-polymers for damping are commercially available and, in sheeting form, and have been sandwich bonded to steel plates using flexible magnetic materials as disclosed in U.S. Pat. 3,817,356. Silicone chemistries have been developed for vane damping, as disclosed in U.S. Pat. No. 5,434,214. In addition, networks of polyurethane-epoxy formulations have been applied to acoustic damping, as disclosed in U.S. Pat. No. 5,331,062. Formulations of crosslinked polymers have been achieved with dynamic loss modulus approaching $10^9$ dyne/cm$^2$ Hz at 20° C., in the frequency band from 0.1 Hz to $10^5$, and tan $\delta$ sufficient to provide reasonable performance in typical damping applications. In addition, these formulations have been engineered to provide enough resistance to cold flow to allow application in the examples outlined above.

However, improved damping characteristics are commonly achieved at the expense of other desired properties. Specifically, manipulation of molecular weight, degree of crosslinking, etc., to improve internal losses, typically leads to undesirable creep resistance, since internal loss in these systems is highly correlated with cold flow. Increase of damping properties beyond a given point in known chemistries, therefore, often leads to materials unable to maintain shape, even under the influence of gravity. Since such characteristics are highly undesirable in practical application, this places serious fundamental constraints on the achievement of improved damping characteristics in practical forms. For this reason, in all of the prior art listed above, fundamental limitations exist on damping performance achievable in articles with good mechanical stability.

To significantly advance the art, therefore, some mechanism for producing high damping performance, combined with mechanical stability, is needed. It is a purpose of the present invention to provide an unexpected means of creating materials with extremely high damping performance, and exceptional resistance to cold flow. As the detailed description below will describe, such stabilization and damping is achieved by the composite of the instant invention.

One example of prior art in the general area of damping composites is the foam construction disclosed by Teroson GmbH in U.S. Pat. No. 4,374,172, wherein materials are incorporated within foams, in varying concentrations spatially, for the purpose of tailoring damping performance across a given system. However, Teroson makes no mention of stabilization of materials which exhibit cold flow. In fact, their trivial binding of a damping material into a foam would not guarantee mechanical stabilization or necessarily provide a high damping performance composite. Serious thought must be given to materials selection because performance will be limited if, for example the foams are too compliant or fail to be sufficiently loaded. No such teaching is provided by the Teroson patent.

Other art relates to the incorporation of fibers into damping materials, or the lamination of such materials between high strength layers of material. High tensile strength fibers have been incorporated into specially formulated damping resins to yield materials for high strength flexible beams with reasonable damping characteristics, as disclosed in U.S. Pat. No. 4,304,694. In addition, damping materials have been laminated between high strength polymer films, as disclosed in U.S. Pat. No. 5,368,916, and sandwiched between very high strength fiber reinforced materials, as disclosed in U.S. Pat. No. 5,487,928, to attempt to achieve higher strength damping composites.

Although fiber composites and laminate/sandwich construction can improve the tensile strength of mechanically stable damping materials, they are still markedly deficient in their ability to significantly improve the cold flow of the composite. In situations where the base material exhibits creep, relative motion of unconnected fibers within the composite is possible. Similarly, lamination of unstable materials between layers of stronger components allows relative motion of these layers and consequent instability. Such constructs, therefore, are themselves unstable if the base material flows over time. This instability places limitations on these composites nearly identical to those of the damping materials upon which they are based. For this reason, U.S. Pat. Nos. 4,304,694, 5,368,916, and 5,487,928 do not teach true stabilization of high loss, mechanically unstable, damping materials. It would be desirable if mechanisms could be found to provide connectivity between the high strength components of these constructs, combined with a mechanism for locking an unstable damping material within the structure. Such a technology would be remarkably novel and potentially yield materials with damping performance never achieved in a mechanically stable form.

Considerable effort has also been devoted to the application of existing damping materials in geometries which optimize overall damping performance (Sun et al., Vibration Damping of Structural Elements, Prentice Hall, 1995). As is well known, the effective performance of a given damping material can be significantly enhanced through the application of constraining layers which induce shear deformations in the damping material as vibration occurs. However, damping limitations are still imposed by the fundamental dynamic losses of the damping material employed. Given a fixed constrained layer geometry, for example, performance improvement is only achievable through the use of damping materials with greater losses.

Since application of constrained layer or other geometrical enhancement, will have limitations set by existing damping characteristics, materials are needed with improved dynamic loss moduli and sufficient tan $\delta$ across the various frequency bands important for specific applications. In addition, materials sufficiently versatile to allow tailoring of response to the vibrational resonances present in specific applications are needed. Finally, the desired damping properties must be achieved without unacceptable degradation in other important physical properties.

In the art cited above, the viscoelastic damping materials employed were specifically tailored to possess good resistance to cold flow. For this reason, the achievement of damping performance, i.e., the lessening of the amplitude of waves or oscillations, has been, heretofore, limited by the trade off with mechanical stability with respect to cold flow. Clearly, a vehicle for extending these technologies to allow the use of damping materials which possess much higher loss properties but which, inherently, exhibit unwanted cold flow, would provide unique utility and value.

SUMMARY OF THE INVENTION

The instant invention is a composite damping material which achieves stabilization through incorporation of mechanically unstable materials within porous constructs which permanently bind the damping material to prevent cold flow. The invention herein also engineers such a construction to provide outstanding damping performance, approaching that of the viscoelastic damping component incorporated within the structure. This concept is novel, and provides a mechanism for producing a new class of damping composites with extremely high loss characteristics.

One objective of the present invention is to incorporate high damping performance materials, which are mechanically unstable with respect to cold flow, into a composite structure, which is inherently stable with respect to cold flow. Composite stabilization of high performance damping materials is of utility in applications requiring materials with improved vibration damping capabilities, dimensional stability, and strength over time. This invention provides composite materials which possess significantly greater overall damping performance than existing materials comprised of polymers formulated for loss characteristics combined with resistance to cold flow. This invention also allows the stabilization of a wide variety of different damping materials with a broad range of properties such as temperature stability, high loss across different frequency bands, and chemical properties tailored for specific applications. Likewise, the incorporation of fillers, which include but are not limited to, carbon black, metallic powders, or inorganic powders, within the scaffolding material or viscoelastic component may be employed to further tailor physical properties. Additionally, stabilization of different damping materials may be achieved with a surprising number of different porous substrates, each of which possess unique utility in specific applications (i.e., low outgassing, conductivity). Stabilized materials, comprising a range of different damping components and porous substrates, can also be fabricated in forms including but not limited to film, sheet, or tube.

It is a further objective of this invention to produce mechanically stabilized damping materials in forms which are well suited to applications in constrained layer or other geometries which provide performance enhancements. This invention provides materials, which in film, sheet, tube, or other forms, may be laminated, pressure bonded, adhesively bonded, ultrasonically welded, or otherwise mechanically coupled, within structures such as constrained layers to yield maximal damping performance. in addition, the invention yields materials with sufficient mechanical strength and integrity to provide good performance characteristics, including structural integrity, in laminates or other structures where damping is required in conjunction with long term mechanical integrity.

The objectives are obtained by the product of the invention which is a composite of a film, sheet, or tube, comprised of a high dynamic loss viscoelastic material filled into the pores of a porous polymer, ceramic, glass or metal substrate. Porous polymer substrates may include, but are not limited to, a fluorinated organic polymer such as microporous expanded PTFE or PVDF; polymer felts such as polyamides, e.g., NOMEX or other synthetic fabrics or felts; polyamides, polyolefins, polyurethanes; and closed or open cell foams of polymers, including but not limited to polyolefins, e.g., polyethylene, PVC or cellulose acetate. Porous ceramics may include, but are not limited to, porous sintered silicas, carbides, aluminas, etc. Porous metal substrates may include, but are not limited to, sintered porous aluminum and stainless steel.

The viscoelastic component may be comprised of materials including, but not limited to polymer resins, such as epoxies, fluorocarbons such as oligomeric perfluorocarbons, low molecular weight fluorocarbons, polyurethanes, acrylics, silicones, polyisobutylenes, and waxes, which preferably possess a mechanical droop time, as defined by test method 3, of less than $10^4$ seconds, and, most preferably, a mechanical droop time less than 500 seconds.

Composites comprised in part of extremely rigid substrates (porous metals, ceramics, and glass) preferably possess a dynamic loss modulus master curve in excess of $1.0 \times 10^9$ dyne/cm$^2$, as defined in test method 2 and analysis method 1, at at least one point in the frequency band from 0.1 Hz to $10^5$ Hz, and most preferably possess a dynamic loss modulus master curve in excess of $1.5 \times 10^9$ dyne/cm$^2$ at at least one point within the same frequency band.

Composites comprised in part of more flexible substrates (porous polymers, felts, etc.) preferably possess a tan δ master curve in excess of 0.1 and a dynamic loss modulus master curve in excess of $1 \times 10^9$ dyne/cm$^2$, as defined in test method number 2 and analysis method 1, in the frequency band from 0.1 Hz to $10^5$ Hz, and most preferably possessing a tan δ master curve in excess of 0.1 and a dynamic loss master curve in excess of $1.5 \times 10^9$ dyne/cm$^2$ within the same frequency band.

Each of these composites, whether rigid or flexible, possess sufficient mechanical stability to preferably yield a droop displacement of less than 1.0 mm, as defined in test method 4, and, most preferably, a droop displacement of less than 0.5 mm.

BRIEF DESCRIPTION OF THE DRAWINGS

FIG. 6 depicts a printed circuit board that includes the damping material of the invention.

FIG. 15 shows a fiber film fixture used for true determination of moduli via dynamic mechanical analysis. Note that the DMA applies a direct deformation to the material under consideration and measures a pure material force response. Through normalization for the cross sectional area of the sample, moduli are calculated.

FIG. 16 depicts a cylindrical platen fixture used for applying fixed stress to material pucks for the purpose of dynamic droop testing in the dynamic mechanical analyzer instrument. Notice that a compressive force is applied to the fixture, to produce a known compressive stress. The resulting displacement of the platens is measured as a function of time.

DETAILED DESCRIPTION OF THE INVENTION

Figure 1:
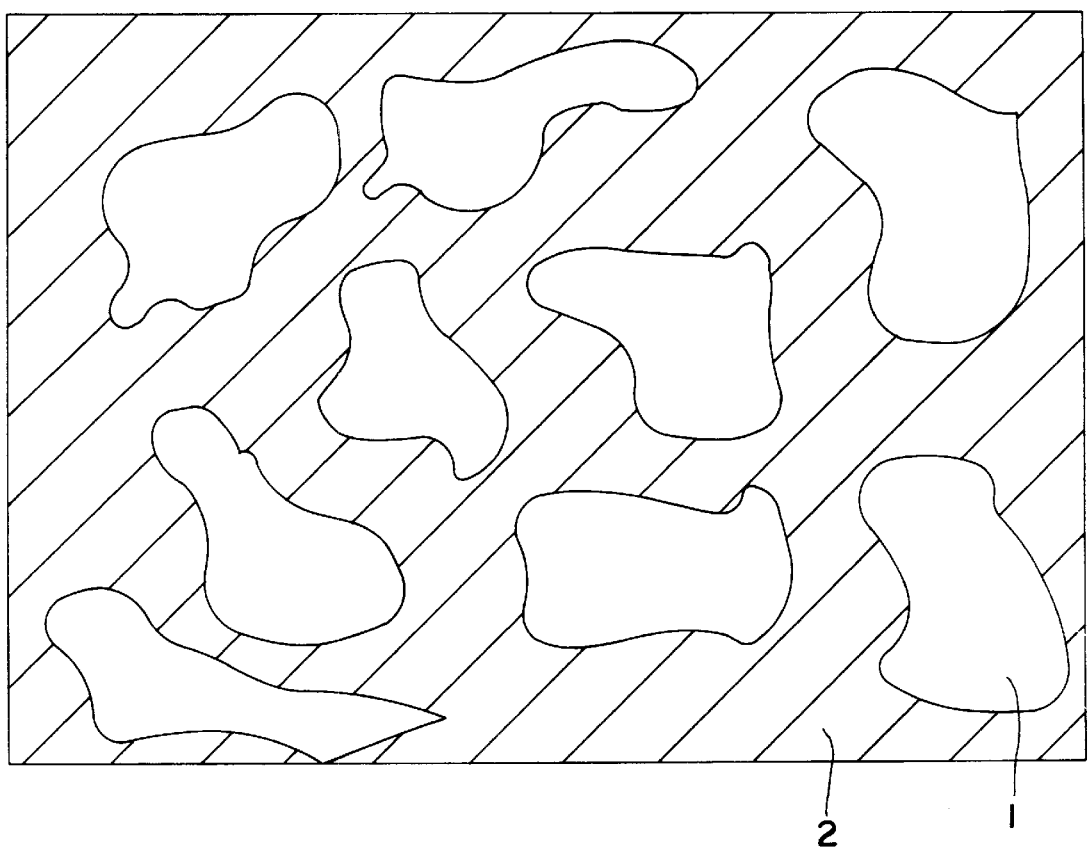
FIG. 1 is a schematic representation of a closed pore structure binding an unstable viscoelastic material within its scaffold. The viscoelastic material is prevented from cold flow by the relative impermeability of the closed cells.

For the sake of understanding, it is necessary to define the meaning of a mechanically unstable material with respect to cold flow as used herein. From a practical standpoint, one measure of stability could be determined by the ability of a material to maintain its shape and not flow under the action of gravity over time. Since such behavior exists, to some degree, in all materials (although it may be so slow as to be undetectable on human timescales), any definition of instability will require the establishment of a practical, although somewhat arbitrary, analytical criterion. In the ensuing discussion, a material will be defined as unstable if, under the action of a compressive stress, a standard puck of the material will creep to a predetermined strain within a specific period of period of time. Specifically, under the action of a defined stress, the material must displace 3 mm within a droop time (as characterized in test method number 3 to follow) of less than $10^4$ seconds. Such a definition is quite conservative, being restricted to materials which are completely unsuitable for applications requiring stability of form.

In a similar way, it is necessary to define the stability of a given composite material. For the purposes of all subsequent discussion, a composite material will be defined as mechanically stable if it possesses a droop displacement of less than 1.0 mm under the application of load for $3 \times 10^4$ seconds (as defined in test method number 4). Again, this definition of stability is conservative, as materials which display less than this level of deformation, under the standard conditions prescribed, are extremely stable and will maintain shape under the action of gravity indefinitely (at least on human timescales).

The objectives of this invention are accomplished through the incorporation of an unstable (by the definitions of instability provided in test method number 3) viscoelastic damping material, which may be comprised of one or more individual chemical components, into the matrix of a mechanically stable porous material. This porous material may be comprised of substances including, but not limited to, polymeric materials, metals, or glasses, in the form of fabrics, felts, microporous structures, or sintered powders, with either open or closed cell pores. In order to insure high levels of composite performance, the choice of viscoelastic damping material (or materials) is tailored to provide optimum performance within the specific frequency band of interest. The viscoelastic material, is filled, partially or fully, within the pores of the polymer matrix. Deformation of the matrix results in deformation of the damping material providing good damping performance, while the underlying porous scaffold provides mechanical integrity and limits the mobility of the damping component. The composite article, therefore, may possess damping capabilities approaching that of the raw viscoelastic material, while also possessing good mechanical stability. This aspect of such composites is exciting and novel in that, for the first time, damping materials which are unsuitable for practical application due to cold flow have been stabilized using a porous backbone.

In one embodiment of the current invention, a mechanically unstable viscoelastic material (according to the definition of instability provided in test method number 3), is entrapped within the closed cells of a porous material. FIG. 1 shows a schematic of such a closed cell structure. Here the viscoelastic damping material (1) is completely enclosed within individual pores of the closed cell substrate (2). Provided diffusion of the damping component through the pore walls is negligible, and that the porous backbone is stable, the damping component is fully entrapped within the composite preventing cold flow. In addition, provided the closed cell structure is comprised of a sufficiently rigid material, deformation of the composite structure results in deformation of the damping component and the desired damping response of the composite.

In a second embodiment of the invention, a mechanically unstable viscoelastic damping material (according to the definition of instability provided in test method number 3) is bound within the structure of an open cell porous material. The composite material is stable with respect to cold flow by virtue of the mechanical integrity of the porous matrix, such that the composite possesses a droop displacement of under 1.0 mm following the application of load for $3 \times 10^4$ seconds as defined by test method number 4. In addition, the composite possesses excellent damping characteristics, with dynamic loss modulus and tan δ in excess of $10^9$ dyne/cm² and 0.1, respectively, at at least one point in the frequency band from 0.1 to $10^5$ Hz, due to the presence of the damping component trapped within the structure.

Each of these embodiments may be created through a variety of processes. Closed cell materials may be created by means, which include, but are not limited to, mixing of the viscoelastic component at high temperature into the melt form of a final matrix material (which may be accomplished through batch or extrusion techniques), mixing of the viscoelastic component into material which is subsequently hardened or crosslinked to produce a matrix, sintering of matrix material powders suitably mixed with the viscoelastic component, etc. In open cell materials, provided the viscoelastic material is wetting in a particular open cell matrix, composites of these materials may be produced through any technique in which the porous material is brought into contact with the viscoelastic material at temperatures above its melt. Vacuum infusion, gravier printing, etc., may also be used to facilitate faster processing. When the desired viscoelastic component is non-wetting in the scaffold, the damping component may be dissolved within a solvent system which is wetting, used to wick the material into the scaffold, and dried to leave the damping component within. In addition, processes including but not limited to vacuum infusion, gravier printing, coating of the scaffold to induce wetting, etc., may also be used to imbide non-wetting viscoelastic materials within a given scaffold.

The stability of the composite material provided by the invention is related to the entrapment of the viscoelastic damping material within the porous substrate matrix. The function of the porous substrate is to both provide overall mechanical stability (resistance to cold flow, strength, etc.) and to bind the viscoelastic damping material within its pore structure. The binding action of the porous matrix occurs in closed cell porous structures by the entrapment of the viscoelastic material within completely closed pores. In open cell porous substrates, binding is accomplished by a number of means.

Figure 2:
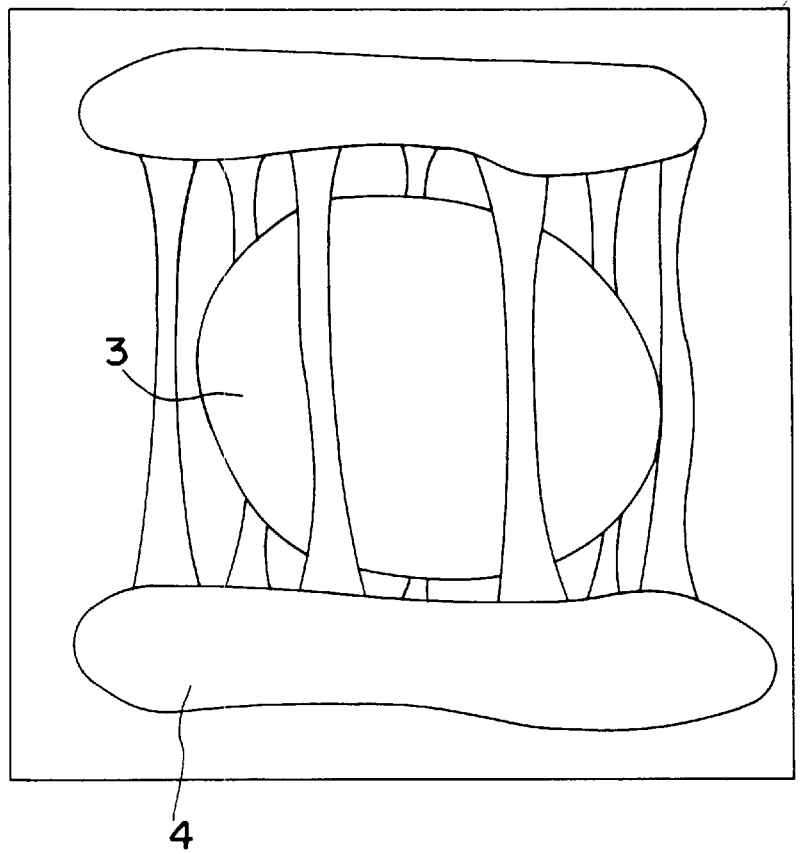
FIG. 2 shows a schematic example of a droplet of non-wetting fluid entrapped within an open cell porous structure. Note the droplet's surface must be pierced by elements of the scaffold structure in order to free it from within the pore. For this reason, surface tension forces entrap the droplet within the pore.
Figure 3:
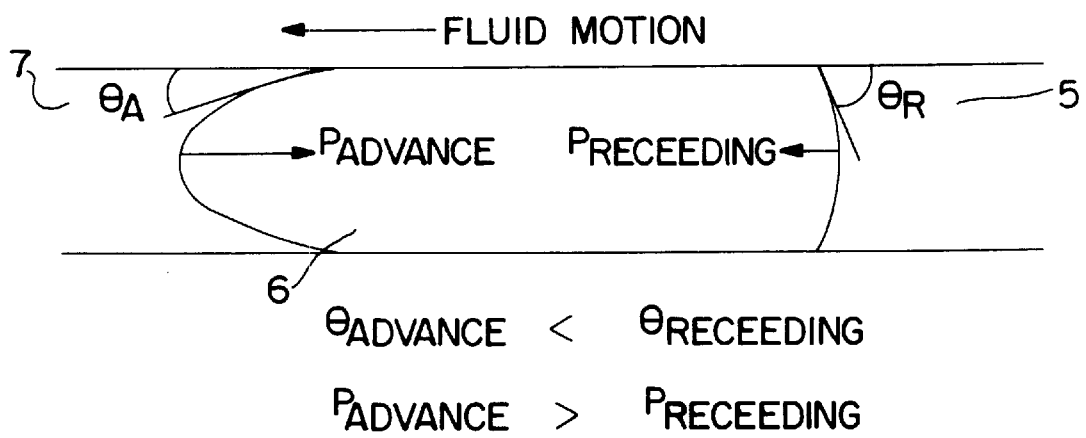
FIG. 3 shows advancing and receding contact angles for a droplet of fluid moving within a capillary. Note that the contact angle on the advancing side of the droplet is greater than that on the receding side. This indicates that a positive pressure is required to overcome surface tension forces and move the droplet at a given speed.

One mechanism for binding in open cell substrates is a result of the contact angle between the damping material and pore walls. The contact angle results in capillary forces (due to surface tension) which trap the material within the pores. Such forces are well known in porous media (J. Bear, "Dynamic of Fluids in Porous Media," Dover, 1972) where fluids may even tend to spontaneously wet and imbibe themselves within specific structures. Even for non-wetting fluids, though, once imbibed, the same forces which tend to resist absorption of the fluid into the structure, can, in certain cases, also tend to stabilize it within the material. Examples of such cases include situations where a free surface of the fluid, within the tortuous matrix of a porous material, must pass into smaller interstices in order to move. FIG. 2 shows an example of such a system, in which a small drop of fluid (3) is constrained within a large pore of the scaffold (4) by tortuous paths. These paths, although open to the interior of the pore, require the surface of the drop to be broken and positive pressure for liberation. In addition, even in small capillaries, a nonwetting fluid will experience a restoring force in response to any pressure tending to move it within. As shown in FIG. 3, this is a consequence of the fact that receding contact angles (5) as a fluid front (6) moves over a surface are nearly always smaller than advancing angles (7). Therefore, restoring pressures also exist in capillaries, or other more tortuous structures, as a consequence of dynamic wetting effects.

In addition to capillary forces, the highly tortuous nature of some open cell porous structures, or the smallness of the interstices within the structure may entrap the viscoelastic material which, once imbibed within the structure, may flow through the material only with great viscous resistance. Resistive pressures result as a consequence of motion of a viscoelastic material within the tortuous interstices of a porous matrix. Such pressures are a consequence of deformations resulting from flow in constrained geometries. Since the viscoelastic properties of damping material require that they present high viscous resistance to deformation, placement within highly constrained geometries results in large resistance to flow. Particularly in systems with very small porous interstices, resistance to flow may be substantial. In combination with surface tension pressures, therefore, resistance to deformation due to viscous forces in constrained geometries, provides additional stabilization of a viscoelastic damping material within a porous structure.

Any combination of these mechanisms may exist and interact within a particular structure to achieve binding. Whatever the binding action, the viscoelastic damping material remains bound within the porous substrate material, and preferably is substantially uniform in distribution therein.

The materials of this invention can be used in many and varied applications. One industry where these improved damping materials would be extremely valuable is the hard disk drive industry (both magnetic and optical drives). Within the magnetic drives commonly used in computers, dampers are often used in many locations to damp vibrations that either cause performance problems or acoustical concerns. To assist in reducing noise emitted from the drive, the materials of this invention could be applied in a constrained layer design on the cover of the hard disk drive. This is shown broadly in FIG. 4, and more clearly in FIG. 5, where the damping material (8) is adhered to the cover (9) and a constraining layer (10), using an adhesive (11) on each side. Beyond generally improved damping performance, the materials of this invention provide added utility over currently available materials because of their ability to be tailored to the acoustic resonance of a particular disk drive. Such resonant modes can vary between different drive designs due to choices in the spindle motor assembly, head actuation, etc., and the ability to tailor peak performance of the damper could greatly reduce sound output. Note that the choice of adhesive layers that are shown can vary, and will be dictated by the needs of each interface, which include, but are not limited to manufacturing concerns, and choice of cover and constraining layer materials. Thus, the adhesive layer used to bond the damping material to the constraining layer may be different that the one used to bond the damping material to the cover.

Figure 4:
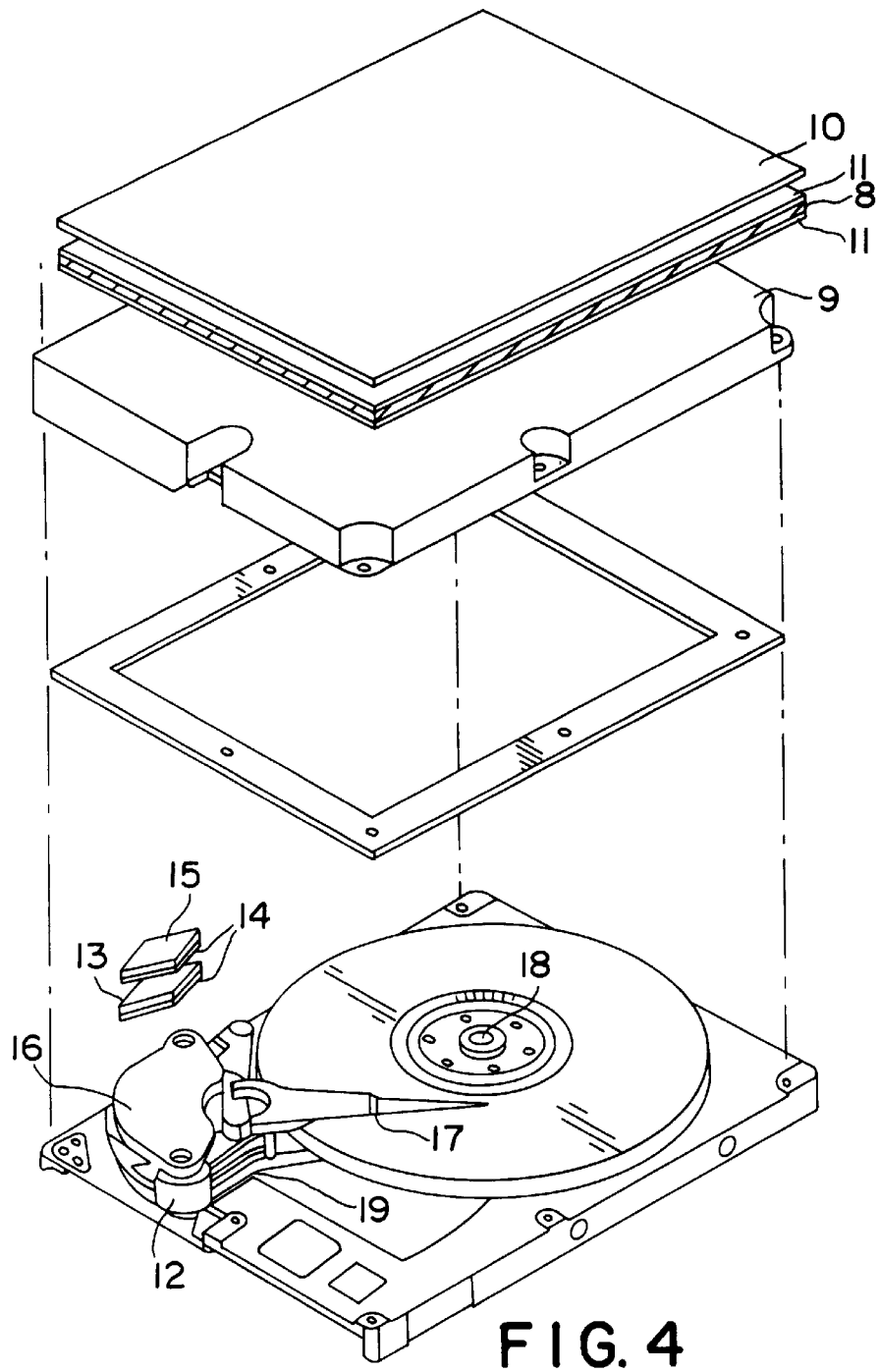
FIG. 4 depicts an exploded view of a hard disk drive with the damping material of the invention located in two areas.
Figure 5:
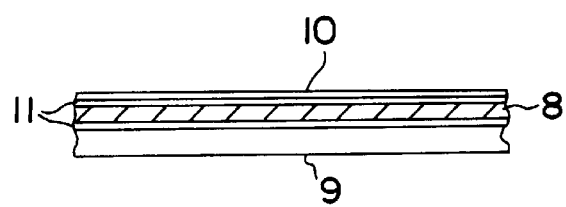
FIG. 5 depicts a cross-sectional detailed view of the damping material of the invention that is shown in the device of FIG. 4.

Another location where vibrations often cause sound problems is on the Voice Coil Motor (VCM). The VCM assembly (12), shown in FIG. 4, is used to move the head stack assembly, and the harsh step-like motion of this magnetic actuation often excites resonance. By applying a layer of damping material (13) to the top of the VCM plates (16) using an adhesive (14), resonant vibrations in the VCM can be damped, thereby reducing acoustical noise. Beyond the value of improved, frequency specific damping performance, materials of this invention could provide additional utility in this application due to the ability to specifically tailor the damping material to be low in outgassing of compounds that may damage drive components or degrade performance. Naturally, a constraining layer (15) could also be attached to the opposite side of the damping material (13), using another adhesive layer (14). As with the last example, the material used for the constraining layer may vary depending on application needs, and the same is true for the adhesive.

In addition to damping vibrations related to noise, better damping materials could also be used to improve disk drive read/write performance, provide a more robust design, and also increase drive reliability by damping vibrations that affect component performance. Locations for such dampers include, but are not limited to the arm/suspension (17), spindle motor (18), and flex circuit (19). In all of these examples, the ability to tailor the material for cleanliness would again be valuable. Likewise, the improved damping performance would add utility in each situation. For example, the damping material can be optimized to reduce the effect of mechanical resonances in the head actuator or spindle system. These resonances are known to limit stability of the control loop and thereby result in a reduction of operational bandwidth for the head or spindle system. Reduction of resonance effects can thereby improve response time for the drive's subsystems. In addition, because of the high damping performance/unit volume, only a very small amount of this material may be required to achieve improvements in performance near resonance frequencies. Therefore, the additional mass due to the damper may be small compared to that of the mechanical assembly itself. This is an important consideration in the design of a high speed closed loop system. As in earlier examples, the damping material would be attached to the vibrating component and, if used, the constraining layer, using one or more types of adhesive.

These characteristics of high damping and low mass are advantageous for other closed loop systems beyond disk drives. To increase response time for robotic assemblies, such as those used for automated assembly operations, the moving arm assembly is designed to have a minimum of rotational inertia. Higher inertial loads limit the stability of the assembly and can result in a lack of control as the gain of the system is increased to improve response time. The reduction of inertia in the assembly can have a detrimental effect on mechanical stiffness which in turn results in results in unwanted resonances in the operational bandwidth of the control system. Lower stiffness can manifest itself as poor coupling between the mechanical load and the position and/or velocity sensor on the drive motor which in turn results in instability and/or inaccuracy of control. Addition of the damping materials of this invention could improve this control without significantly altering system inertia.

Figure 7:
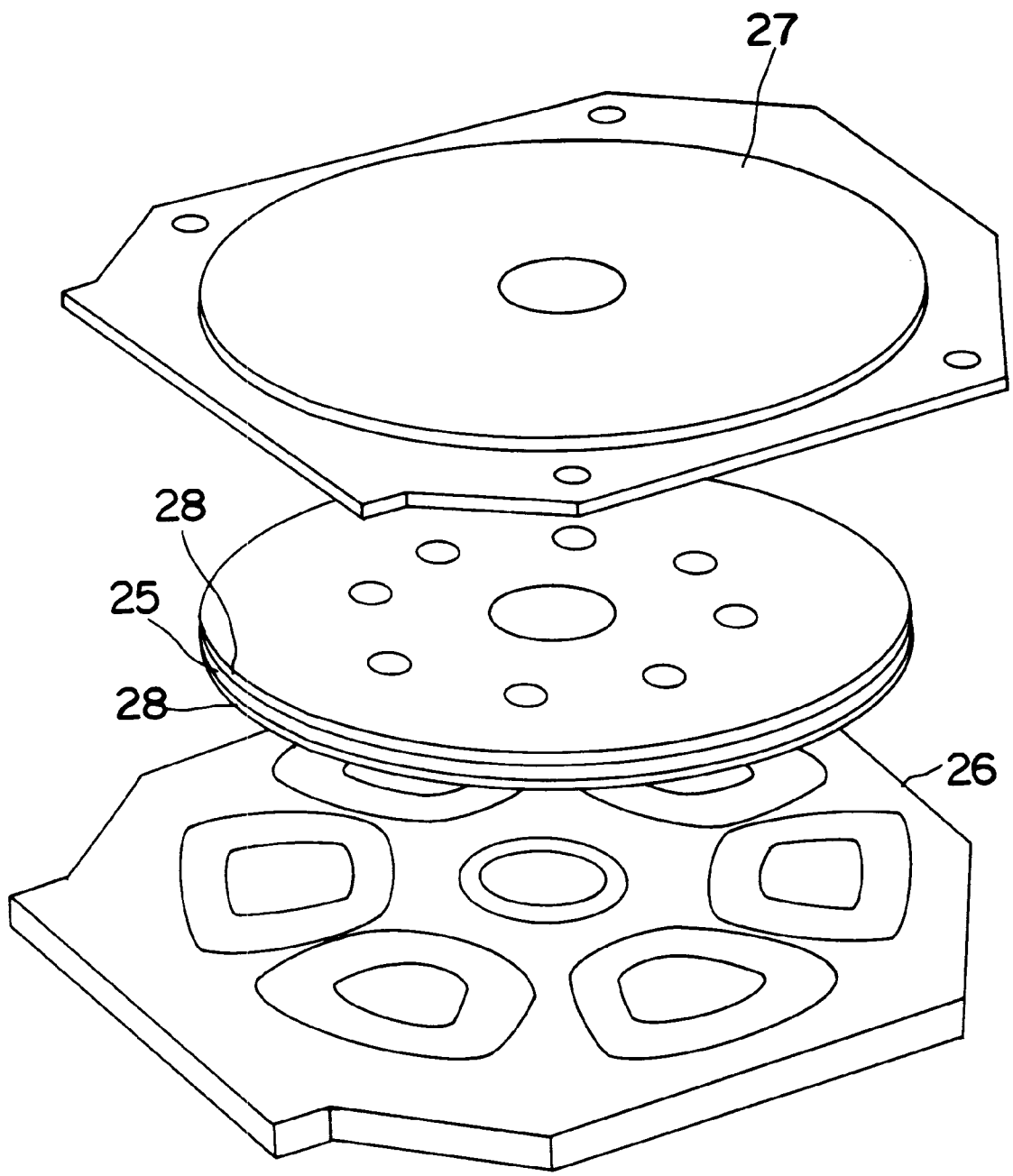
FIG. 7 depicts a motor system which employs the material of the invention.

Materials of this invention would also provide added value in other sensitive electronic equipment. Tailored vibration damping can help to improve response, accuracy, and performance in items such as precision optical systems, CD-ROMs, lasers, video cameras, testing devices, computers, printers, stereo systems, CD players, speakers, etc. For example, FIG. 6 shows a picture of a printed circuit board. Damping materials (20) can be attached to the circuit board (21) using an adhesive layer (22). (A constraining layer (23) could again be optionally attached to the damping material using an adhesive (22)). Beyond tailoring the damping material to the resonance of this particular system, damping materials of this invention could also include fillers (24) designed to provide added utility, such as dielectric strength, heat conduction, etc. Another example is shown in FIG. 7, which depicts a representative motor system that could be used in items like cassette players and video cameras. Damping materials (25) would be attached between the drive motor (26) and cover (27) using adhesive layers (28) to minimize structural vibrations and quiet operation. Once again the choice of adhesive may not be identical for each interface.

In yet another example, the materials provided by this invention can be employed within precision optical systems. Optical systems designed for measurement of minute dimensions include interferometers and holographic detection systems. Because the resolution of these systems is typically on the order of magnitude of the wavelength of light being employed, small vibrations can interfere substantially with precision of the device. A damping system may be introduced into the design which is optimized to reduce the noise caused by vibration. Because these newly invented damping materials can be constructed to be extremely clean, they are particularly well suited for applications involving precision optical components.

Figure 8:
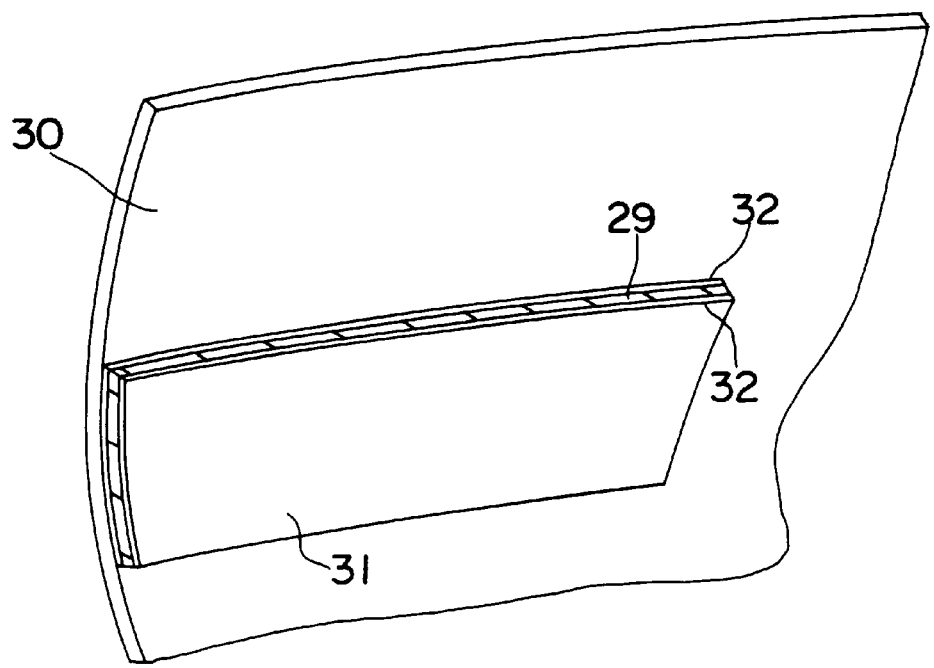
FIG. 8 depicts a body panel of a vehicle which employs the material of the invention.
Figure 9:
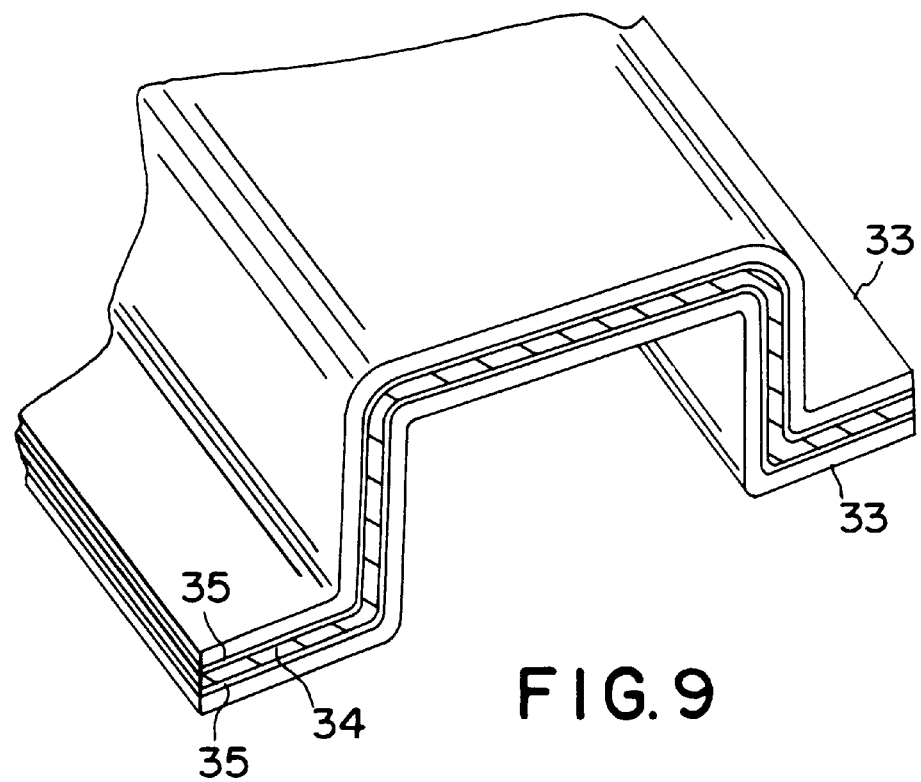
FIG. 9 shows a laminate metal construction which includes the material of the invention, for use in items such as a bracket or pan.

The materials provided by this invention also provide utility in minimizing vibration or noise in vehicles used for ground transportation. Automotive vehicles (such as cars, trucks, vans, and military vehicles) need to employ damping materials in numerous locations to minimize vibrations. Such applications include, but are not limited to door panels, body panels, valve covers, brackets, pans, exhaust systems, engine mounts, etc. Each of these mechanical and structural components has its own resonant signature, and the combined effects of these vibrations often cause significant noise and structural vibration. Improved damping materials could revolutionize their designs. FIG. 8 depicts a damping material (29) attached to a body panel (30) and a constraining layer (31), using adhesive layers (32). FIG. 9 shows a laminate metal construction for use in items like brackets and pans, where metal layers (33) are bonded to the damping material (34), using adhesive layers (35). (Again, adhesive selection could vary to allow for bonding to different metals, etc.) Beyond damping performance, additional utility could be obtained from materials of this invention due in part to the ability to tailor chemical compatibility and temperature resistance. Likewise, the greater damping performance per unit volume of this material may necessitate use of only a small amount of this material, thus creating a lower mass system which would add value due to its impact in lowering fuel consumption.

Figure 10:
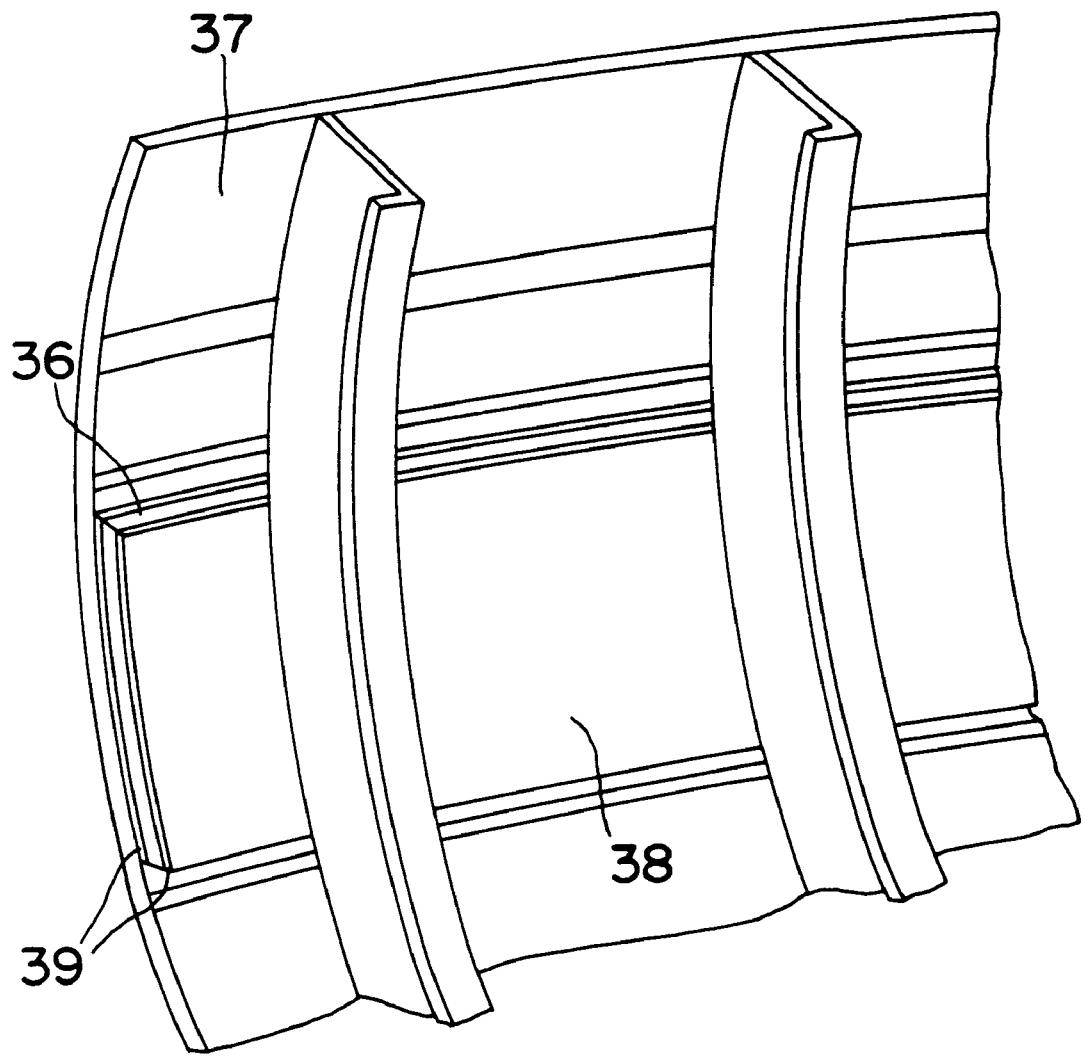
FIG. 10 depicts the material of the invention bonded to a vehicle panel such as is used in aircraft.

The aerospace industry also has significant need for improved damping materials. Within commercial aircraft, damping materials are often employed on the fuselage to quiet vibrations that lead to structural metal fatigue, as well as interior noise. FIG. 10 shows the damping material of this invention (36) bonded to the skin of an aircraft (37) and a constraining layer (38), using adhesive layers (39). As in all applications, the adhesive system chosen may be tailored to best suit the metals being bonded, as well as other needs like operating temperature, etc. Likewise, constraining layer and damping material choice could be tailored to meet specific performance needs of a certain aircraft design. Damping materials of this invention could also be employed in satellites and other spacecraft to minimize the damaging effects of launch vibrations, booster rockets, etc. Additionally, these improved damping materials would help to further protect sensitive control equipment present on all flight vehicles. In each of these applications, the material of this invention could offer unprecedented damping performance, as well as other performance benefits like lower mass, heat transfer capabilities, etc.

Figure 11A:
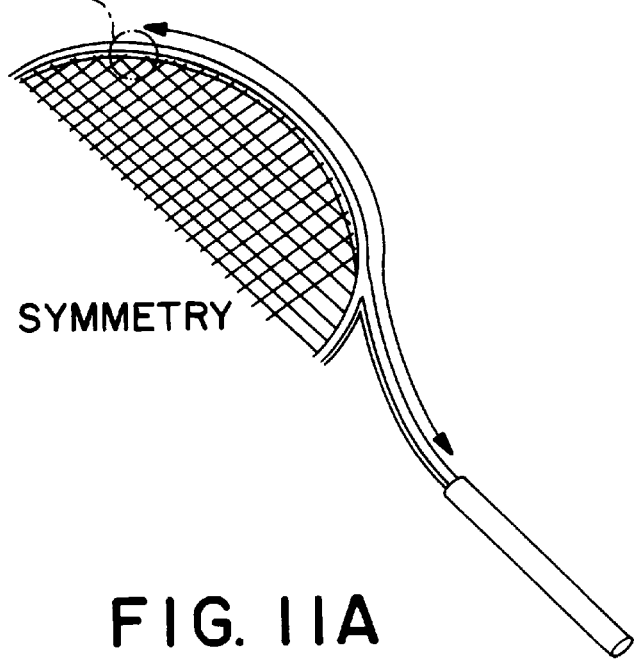
FIG. 11 shows a cutaway view of a tennis racket frame containing the material of the invention.
Figure 11B:
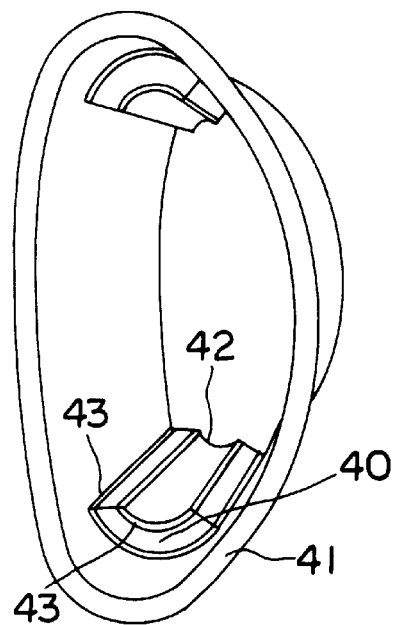

The materials of this invention may also be utilized to improve the performance of sporting equipment. Items like tennis racquets, bats, and golf clubs have "sweet spots" within their design. When playing with such equipment, if the impact is outside of this region, it causes vibrations which are distracting and annoying to the player. Use of the vibration damping materials of this invention in such applications could reduce the physical stress that is transmitted to the body. In a similar manner, vibrations within skis can detract from performance and be bothersome to the skier. Improved damping materials would be of value to those who require superior performance from the equipment that they use. FIG. 11 shows an example of how this material might be employed in a typical racquet: the damping material (40)

is attached to the inside of a racket frame (41) and a constraining layer (42), using adhesive layers (43). Note that placement of the damping system in the racquet, and within (or upon), any other piece of sporting equipment is specific to the design of the particular item and the resonant modes of the design. Choice of the adhesive and constraining layer will be made to fit the constraints, and the material of this invention will be able to be tailored to optimize damping performance beyond currently available technology.

Figure 12:
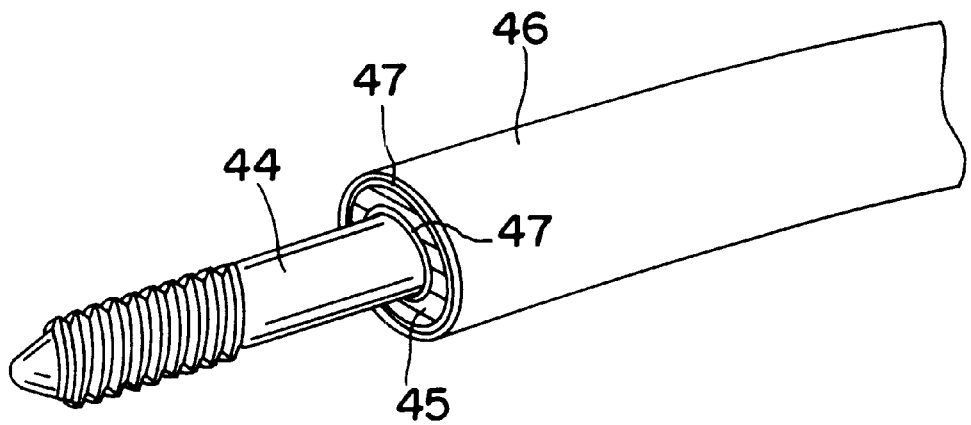
FIG. 12 depicts a drill rod containing the material of the invention.

Another important application for improved damping materials involves the control of mechanical oscillations induced during machining operations such as mill or lathe work. Specifically, in any cutting operation where the work or cutting fixtures can experience significant deformation under the action of cutting forces, oscillations, commonly referred to as chatter, often occur. Mild chatter can result in poor surface finishes and limit the lifetime of cutting tools, while more violent oscillations can result in the immediate destruction of tooling, work piece, and fixtures. Damping materials, attached to fixtures, tool holders, the work piece, or, any other components of a machining system, can be used to limit these oscillations and their effects. In particular, the materials of this invention could be used in a variety of physical forms, such as tape, to attach to machining elements for reduction of chatter. FIG. 12 depicts one embodiment of a constrained layer damping treatment on drill rods. The drill rod (44) is attached to the damping material (45) and a concentric tubular constraining layer (46) using adhesive layers (47).

The damping materials of this invention can also be used to damp mechanical oscillations which occur in electrical wire and cable, resulting in acoustical or electrical noise. Cables employed in undersea acoustic arrays, for example, exhibit mechanical oscillations, commonly referred to as strum, as currents flow over the cables. These oscillations are picked up as noise by array hydrophones, and limit the signal to noise achievable with seismic and surveillance arrays. Cables with sheathing provided by this invention, therefore, would have utility in increasing the sensitivity of such systems. For example, a damping sheath (which may also serve as a dielectric insulator) can be employed to control strum in an acoustical array. In other cabling applications, where extremely low electrical noise is a requirement, triboelectrical noise, resulting from mechanical movement or vibration of a cable, can present serious signal to noise problems. Use of damping materials to limit mechanical oscillations in such systems, therefore, can provide utility in reducing such noise. In coaxial and flat cable systems, damping material is incorporated either as the insulating dielectric, or as an additional layer, to reduce triboelectrical noise. Finally, transformer wires, and other power bearing wire/cable systems, commonly exhibit oscillations induced by alternating current. Such oscillations result in noise (such as the hum associated with power transformers). The damping materials of this invention could be used to control such noise, either as a wire sheath or separator.

An additional area where the improved damping materials of this invention could be used to provide performance enhancements is within appliances. In equipment such as washing machines, vibration causes significant structure borne noise. As in other applications discussed, the addition of the damping materials of this invention could provide damping significantly beyond what is available in the current art.

TEST METHODS AND ANALYSIS METHODS

In order to determine the relative merits of various damping composites, two specific test methods, based on Dynamic Mechanical Analysis (DMA), were developed and employed. These methods allow direct determination of the damping performance of a specific material and analytical comparison of its viscous losses relative to other systems. A specific theoretical analysis, used to derive high frequency damping performance results from the data produced by these methods, is also defined in detail. Two further test methods, which allow quantification of the relative tendency of materials to exhibit cold flow are also defined. These methods, exactly as outlined in the following discussion, were employed to assess the relative damping performance and mechanical stability of the materials presented in the examples. In addition, these methods are used to define composite properties in our claims and discussion.

Test Method 1—Damping Performance on Steel Beam in 3 Point Bending

Figure 13A:
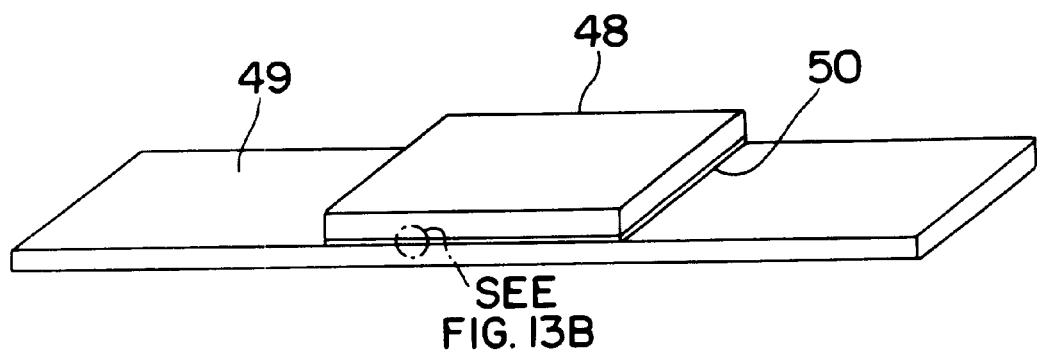
FIG. 13 depicts a rectangular swatch of damping material affixed to a steel beam in preparation for dynamic mechanical analysis of the system. Note that this system is highly representative of actual applications, and that determination of damping in this system constitutes real world reduction to practice. Also notice that the swatch is attached with some adhesive which has an influence on system response.
Figure 13B:
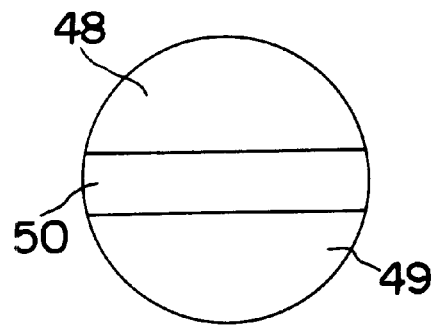

This test method involves bonding a standard rectangular swatch of the material to be tested to a steel beam and determination of effective loss modulus and tan δ of the composite system across a range of frequencies using DMA. A standard steel beam is employed with a thickness of 0.051 cm, width of 1.27 cm, and a measured Young's Modulus of $1.8 \times 10^{12}$ dyne/cm$^2$. The material is bonded to the beam with a very thin layer of an adhesive. Because the specific adhesive employed can influence results, a very thin layer of the viscoelastic damping material, present in the sample, is used for this purpose. In cases where tests were performed on other materials for comparisons, a standard adhesive, available commercially from the Minnesota Mining and Manufacturing Co. under the trade name ISD112, was used. This swatch of material, bonded to the steel beam, has standard dimensions of 0.165 cm in thickness, 1.91 cm in length, and exactly the same width as the steel beam. This swatch (48) is bonded to the center of a length of the steel beam (49), using the appropriate adhesive (50), as shown in FIG. 13. An effective dynamic loss and storage modulus of this composite system is then determined using DMA and further used to calculate an effective tan δ.

Figure 14:
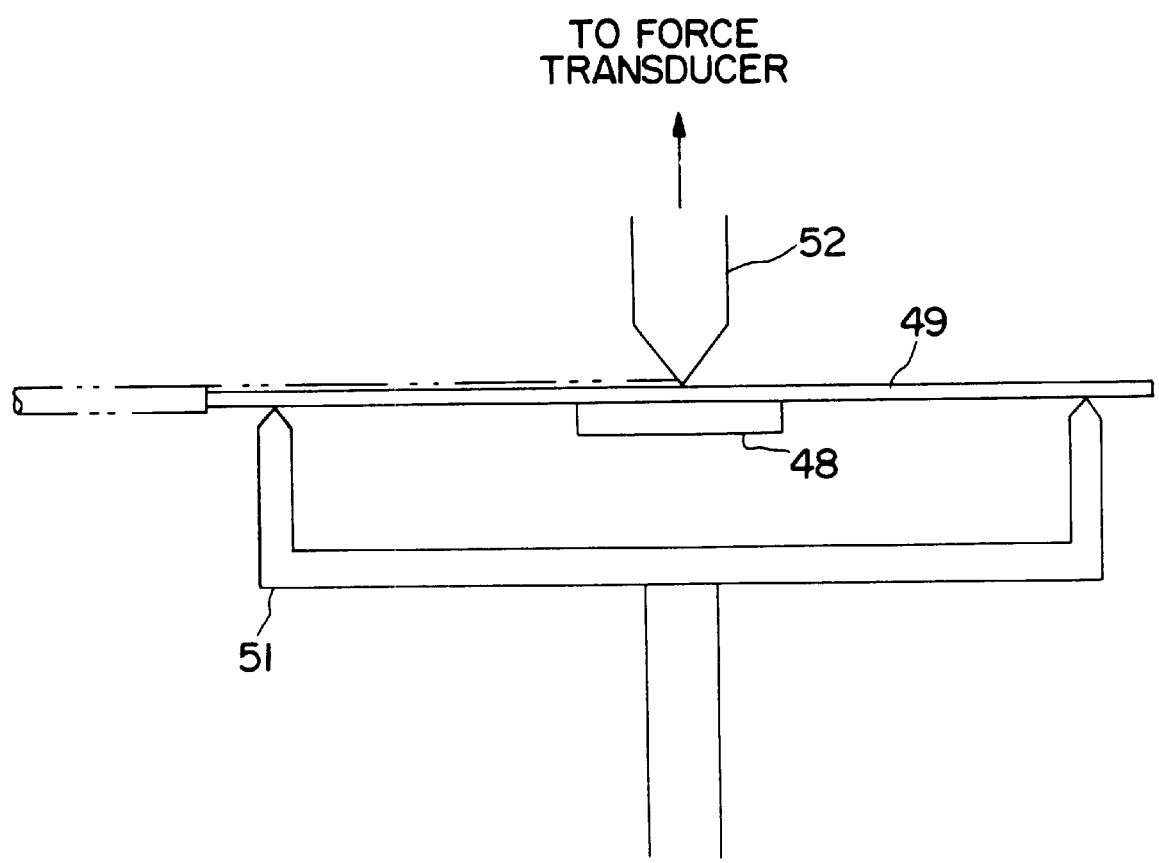
FIG. 14 depicts a three point bending fixture used to perform dynamic mechanical analysis on steel beams with damping material affixed. Note that the DMA instrument applies a deflection to the center of the simply supported beam, and measures the resulting force response.

The specific DMA test method employed to determine the effective dynamic loss and storage modulus of the composite system involves the use of a standard three point bending geometry. The steel beam (49) is simply supported in the DMA instrument between two fulcrums (51) a distance of 4.8 cm apart as shown in FIG. 14. A third fulcrum (52), attached to the DMA force transducer, is placed in contact with the center of the beam system, directly above the center of the damping material swatch (48), also as shown in FIG. 14. A static force of 150 gmf to 200 gmf is applied to the center fulcrum to insure constant contact during dynamic testing. This force is controlled to within a tolerance of plus or minus 5 percent during the entire testing sequence. Following application of the static force to within the desired tolerance, an oscillatory strain is applied to the beam system by changing the relative distance between the upper and lower fulcrums. The relative distance between the upper and lower fulcrums, δ, in the direction normal to the upper surface of the beam, is controlled to follow the sinusoidal form $$\Delta = A \sin(2\pi f t) + \Delta_0,$$

where, A is the amplitude of the motion, f is the frequency at which measurements are desired, t is the time from the beginning of the oscillatory strain, and $\Delta_0$ is the static value which is determined by the steel beam thickness and the static force. The amplitude of the motion, A, is standardized to be $7.84 \times 10^{-3}$ cm, such that the strain amplitude, as defined by the Rheometrics software, is 0.005 percent.

Using the DMA instrument, oscillatory strains are applied to the system and the dynamic forces which result are measured over 3 complete $2\pi$ cycles of the motion. The resulting dynamic force, F, will not be perfectly in phase with the applied strain due to the damping losses which occur within the system. The dynamic force may be expressed as $$F(t) = F_{amp} \sin(2\pi ft + \delta) + F_0,$$

where $F_{amp}$ is the overall amplitude of the dynamic force, $\delta$ is the phase offset produced by damping losses, and $F_0$ is the static force value. As is well known, this expression is easily rewritten as the sum of two separate dynamic forces, one of which is purely in phase with the original strain (a purely elastic term), and one of which is 90 degrees out of phase with the original strain (a purely viscous or damping related term). The dynamic force expression then becomes $$F(t) = F_{amp} \cos(\delta) \sin(2 \times ft) + F_{amp} \sin(\delta) \cos(2\pi ft) + F_0.$$

When written in this form, $F_{amp} \cos(\delta)$, represents the component of the dynamic force identically in phase with the strain (a purely elastic or storage component), while $F_{amp} \sin(\delta)$ represents the component of dynamic force 90 degrees out of phase with the strain (a purely viscous or loss related term). As is common notation, these in and out of phase forces will be denoted by, $$F' = F_{amp} \cos(\delta),$$

and $$F'' = F_{amp} \sin(\delta).$$

These forces may now be used to calculate effective dynamic loss and storage moduli for the system and an effective tan $\delta$.

In order to understand the definitions of effective dynamic loss and storage moduli to follow, it is important to first understand that the quantities to be defined represent an effective composite modulus for the beam and damping material system. This is easiest to understand through consideration of the methods typically employed to determine moduli from beams in three point bending.

As is well known from basic elastic theory, the static load vs. displacement for a simply supported beam loaded at its center is given by $$F(\Delta) = \frac{48 E I}{l^3} \Delta,$$

where E is the Young's modulus for the material comprising the beam, I is the distance between the lower supports, $\Delta$ is the displacement of the midpoint of the beam, and I is the cross sectional moment of the beam given by $$I = \frac{wT^3}{12},$$

where, w is the beam width, and T is the beam thickness. This expression may be solved for the Young's modulus of the material in terms of the other parameters to yield $$E = \frac{l^3}{4wT^3} \frac{F}{\Delta}.$$

As is typical, the dynamic storage modulus of a beam, E', may be calculated analogously, at a particular frequency f, using the dynamic version of the same expression, $$E'(f) = \frac{l^3}{4wT^3} \frac{F'(f)}{\Delta}.$$

Similarly, the dynamic loss modulus of the material may be calculated by substituting the loss component of the force into the same expression to yield $$E'' = \frac{l^3}{4wT^3} \frac{F''(f)}{\Delta}.$$

Calculation of dynamic loss and storage modulus is, thus, rather trivial in the case where the system being tested has a simple beam geometry. Such is not the case, however, where a composite system, comprised of a beam and a bonded swatch, is tested as a composite system. For such a system, without a complex analysis of strain in both the beam and swatch, it is not possible to determine dynamic moduli for the two specific components of the system rigorously.

Although it is complex to determine dynamic moduli for the damping material by testing the beam and swatch system, the response of such a system is a relative measure of damping material performance. For this reason, it desirable to define effective moduli for such a system, and an effective tan $\delta$, which, although not representative of real quantities for the components of the system, allow the merits of different standard swatches to be determined. For this purpose, the effective dynamic moduli of the composite system are defined to be $$E'_{\text{eff}}(f) = \frac{l^3}{4wT^3} \frac{F'(f)}{\Delta},$$

and $$E''_{\text{eff}}(f) = \frac{l^3}{4wT^3} \frac{F''(f)}{\Delta}.$$

where I, w, and T are taken to be the length, width, and thickness of the steel beam respectively. Similarly, an effective tan $\delta$ is defined as $$\tan_{\text{eff}} \delta = \frac{E''_{\text{eff}}(f)}{E'_{\text{eff}}(f)}.$$

These quantities represent the values which would be obtained if a pure beam of material were tested which yielded exactly the same force response as that of the steel beam combined with the damping swatch.

Comparisons of the effective dynamic loss modulus and the effective tan $\delta$ for swatches consisting of different damping materials, provides a means of differentiating the relative merits of these materials in a real system. Materials with superior damping performance will yield higher dynamic loss moduli and tan $\delta$ in comparison to other materials. The effective tan $\delta$ for the system provides additional insight into how a given material will perform as a component in real systems where damping of extremely rigid metal components is needed. In addition, such a test allows direct demonstration of actual performance in a real bonded application.

All of the testing to be presented was carried out using a Dynamic Mechanical Analyzer manufactured by Rheometric Scientific and designated as the Rheometrics Solids Analyzer II (RSA II). The specific test method employed in the Rheometrics software (designated as Rhios version 4.0.1) is the default dynamic strain test. Parameters in the method are set to sweep frequency from 1 radian per second to 100 radians per second logarithmically. The strain input into the method is 0.005 percent. The 3 point bending geometry is employed with this test method with the length set at the standard separation of the support fulcrums (4.8 cm), the width set to the standard width of the steel beam (1.27 cm), and the thickness set to the thickness of the steel beam (0.051 cm).

Test Method 2—Direct Determination of Dynamic Moduli in Fiber-Film Geometry

Although relative comparisons of damping performance are possible from determination of damping performance on a steel beam in 3 point bending, it is also desirable to directly determine loss and storage moduli for the damping composite. Direct knowledge of these fundamental material quantities is of obvious value in predicting performance in a wide range of applications, although such testing is further removed from direct measurements in a bonded system.

The specific DMA test method employed to determine dynamic loss and storage moduli of a composite material involves cutting the material into a strip 0.635 cm in width and 3.0 cm in length. The sample (53) is then restrained within the jaws of a DMA test fixture (54) as shown in FIG. 15. The standard jaw faces employed have a width of 1.25 cm and a thickness of 0.38 cm. The standard gage length (distance between the jaws) employed in the testing is 2.3 cm. The sample is then placed under a static force sufficient to prevent sample buckling during dynamic testing and this force is controlled to within 5 percent during the entire procedure. Once this static force has been achieved to within the desired tolerance, the distance between the upper and lower jaws, D, is controlled to follow the sinusoidal form $$D = A \sin(2\pi f t) + D_0,$$

where A is the amplitude of the oscillation, f is the frequency of the oscillation, and $D_0$ is the static gage of the sample as determined by initial mounted sample length and the static force. The amplitude of the motion is determined to yield appropriate signal under the specific conditions of the test (under the assumption that linear viscoelasticity is maintained).

Using the DMA instrument, these oscillatory strains are applied to the system and resulting dynamic forces are measured over 3 complete $2\pi$ cycles of the motion. Just as in the three point bending testing, the resulting dynamic force, F, is then written as a sum of a term which is in phase with the strain (an elastic component) and a term which is 90 degrees out of phase with the strain (a purely viscous or damping term). The dynamic force expression then becomes $$F(t) = F_{amp} \cos(\delta) \sin(2\pi f t) + F_{amp} \sin(\delta) \cos(2\pi f t) + F_0.$$

When written in this form, $F_{amp}\cos(\delta)$, represents the component of the dynamic force identically in phase with the strain (a purely elastic or storage component), while $F_{amp}\sin(\delta)$ represents the component of dynamic force 90 degrees out of phase with the strain (a purely viscous or loss related term). As is common notation, these in phase and out of phase forces will be denoted by, $$F' = F_{amp}\cos(\delta),$$

and $$F'' = F_{amp}\sin(\delta).$$

These forces may now be used to calculate dynamic loss and storage moduli for the material and tan $\delta$.

According to typical definitions, dynamic loss and storage moduli are now defined as $$E'(f) = \frac{F'(f)}{Tw} \frac{1}{A/L}$$

and $$E''(f) = \frac{F''(f)}{Tw} \frac{1}{A/L}.$$

where T is the measured thickness of the sample, w is the standard sample width, and L is the gage length of the sample. Tan $\delta$ is now calculated using typical definitions:

$$\tan\delta = \frac{E''(f)}{E'(f)}.$$

These quantities now represent fundamental material properties representative of internal elastic and viscous stresses at a given frequency and strain.

All of the testing to be presented was carried out using a Dynamic Mechanical Analyzer manufactured by Rheometric Scientific and designated as the Rheometrics Solids Analyzer II (RSA II). The specific test method employed in the Rheometrics software (designated as Rhios version 4.0.1) is the default dynamic strain test. Parameters in the method are set to sweep frequency from 1 radian per second to 100 radians per second logarithmically. This method is run using the fiber film geometry. The length is set to the standard gage length of 2.3 cm, the width is set to the measured sample width, and the thickness is set to the measured thickness of the sample.

Test Method 3—Mechanical Droop Time Determination

In order to quantify the instability of viscoelastic damping materials with respect to cold flow, a test method for measuring the deformation response of the material to an applied stress was developed. This test method involves placing a standard puck of the material (55) between two circular flat platens (56) within a DMA instrument, and the application of a constant compressive load to the system as shown in FIG. 16. Under the action of the resulting constant stress, the material exhibits a creep response, resulting in relative motion of the platens. This motion is measured and used to quantify the degree to which the material displays cold flow under the action of an external stress.

To provide systematic comparisons between different materials, care is taken to insure that the contact between the puck and platen surfaces is lubricated such that slip boundary conditions occur at these interfaces. This allows the development of nearly pure squeeze flow in the material, and prevents shear deformation, which would result in more complex response (See for Example, Bird et al., Dynamics of Polymeric Liquids, Vol. 1, Wiley, 1987 and Middleman, The Flow of High Polymers, John Wiley and Sons, 1968). As shown in FIG. 16, a thin lubricant layer (57) consisting of a fluorinated grease, sold commercially by the E.I. DuPont DeNemours Co. under the trade name of Krytox GPL-226, is applied at the surfaces to insure good slip conditions. This lubricant is found not to significantly interact with the materials under consideration, providing a good lubricant layer without solvation of the puck, etc.

Since comparisons are desired near ambient temperature conditions, this test method is carried out at a controlled temperature of 20° C. The puck dimensions are arranged to provide good deformation signal over a reasonable testing time. The standard puck size is 1.6 cm in diameter and 0.83 cm in thickness.

Following equilibration of the puck and fixture system at 20° C., the DMA is used to apply a compressive force of 35 gmf to the system. The compressive displacement of the platens is then measured by the instrument as function of time. The droop time is defined as the time required for the platens to compress by 3.00 mm under the action of the applied load (note that this time would be essentially infinite for highly stable or elastic materials). For the purposes of all the descriptions of our invention, data presented in our examples, and specifications used in our claims, a material is defined as being unstable with respect to cold flow if this droop time is less than $10^4$ seconds.

The specific DMA instrument used to carry out all the testing shown in our examples is the Rheometrics RSA II. The software used to carry out the testing is Rheometrics RHIOS version 4.0.1. The test method employed is the constant stress default test with the stress set to maintain a constant force of 35 gmf. The geometry employed with the test is the cylindrical geometry with the diameter set to 1.6 cm, and the length set to 0.83 cm. The estimated viscosity parameter, used by the test method to achieve appropriate control, is set to the value $3.0 \times 10^5$ P, yielding acceptable stress tolerance.

Test Method 4—Mechanical Droop Displacement Determination

In order to quantify the relative stability of composite materials, or other stable materials, it is necessary to perform analytical comparisons of materials which, effectively, display little or no creep following the application of stress for long periods. For the purposes of such comparison, the exact procedure employed in method number 3, is applied to a standard puck of the material. Because stable materials display little or no cold flow, however, the stress is applied for $3 \times 10^4$ seconds and the resulting deflection is measured. This long term deflection, following the application of stress, is defined as the droop displacement of the material for all of the discussion and analysis herein.

It is important to recognize that even perfectly elastic materials will experience some droop displacement purely due to the elastic deformation resulting from the application of a stress. Typically, most highly stable elastomers and plastics will experience a displacement of less than 0.5 mm using the procedure above. For this reason, a material is defined to be mechanically stable with respect to cold flow if the mechanical droop displacement is found to be less than 1.0 mm. Such a definition is, again, quite a conservative definition of stability, since any material satisfying this constraint is well beyond the limits of stability required to maintain shape under the action of the stresses relevant in typical damping applications.

Analysis Method 1—Time Temperature Superposition

Although it is desirable to accomplish comparisons of the damping performance of different materials across a very broad range of frequencies extending well into the acoustic range, dynamic mechanical testing at such frequencies is difficult and costly. The typical frequency range achievable with commercial DMA instruments spans the range from well below 1 Hz (which present no particular technical difficulties other than the time necessary to perform the testing) up to frequencies of approximately 30 Hz. Although this range is sufficient to analyze performance relevant to very low frequency applications, typical applications require knowledge of damping performance at frequencies which may extend beyond 22 kHz. As is typical in may polymer characterization scenarios, an understanding of high frequency performance may be obtained through an analysis of low frequency data taken over a range of different temperatures. The technique employed for such analysis is commonly referred to as time temperature superposition.

Time temperature superposition techniques are well known and documented in literature. To prevent any ambiguity, however, the specific method employed in the analysis to follow will be outlined in detail. The method is based on the fact that frequency dependent mechanical properties of polymeric materials scale in a specific fashion with temperature. In particular, relaxation processes, which drive dynamic properties in materials, are significantly slowed as temperature decreases. Under the action of external strain at a given frequency, therefore, dynamic processes at a particular reference temperature have a particular relationship to those which occur at some higher frequency at a lower temperature. Given a proper understanding of the scaling resulting from temperature changes, information concerning the high frequency dependence of dynamic properties in a material at a given temperature is obtainable from low frequency dynamic properties measured at low temperature.

For the purposes of all of the discussion to follow, dynamic moduli in the polymer systems under consideration are assumed to obey the following scaling law as a function of temperature:

$$E'(f, T_{ref})) = \frac{T_{ref}}{T_{new}} E'(\alpha(T_{ref}, T_{new})f, T_{new}),$$

and $$E''(f, T_{ref})) = \frac{T_{ref}}{T_{new}} E''(\alpha(T_{ref}, T_{new})f, T_{new}),$$

where $\alpha(T_{ref}, T_{new})$ is an empirical time scaling factor which compensates for changes in internal relaxation times as a function of temperature, $T_{ref}$ is the absolute temperature at which reference measurements are made, and $T_{new}$ is the absolute temperature at which another set of measurements are made. In order to construct a so called time-temperature master curve at a particular reference temperature, a series of measurements are made at different temperatures across the broadest range of frequencies practically achievable with a given DMA instrument. Temperatures are chosen which are sufficiently close together such that overlap (or near overlap) occurs in the scaled dynamic moduli once properly scaled. This allows determination of the scaling constant $\alpha(T_{ref}, T_{new})$ by adjustment until an appropriate continuous (or near continuous) curve is obtained. The resulting master curve at a particular reference temperature represents the expected dynamic moduli across a very broad range of frequency at that particular temperature.

All of the time temperature superposition master curves to be presented were constructed through direct adjustment of the temperature scaled raw data consisting of frequency sweeps at different temperatures. The scaling constant, α, was adjusted until overlap was achieved between the temperature scaled data at different temperatures.

This exact procedure was followed to produce the E" master curves presented for both three point bending and fiber film data.

Although it is trivially obvious that application of this analysis to fiber-film data is rigorously correct, the applicability of such methods to three point bending data for a composite system is less obvious. It may be shown, however, that, in the case of three point bending for a steel beam with a damping composite swatch bonded to its surface, these techniques also yield accurate time-temperature master curves for effective E".

The generality of the time temperature superposition methods with respect to the steel composite system is a consequence of the insignificance of the dynamic loss modulus of steel. Because of this, the effective E" for the system, and any associated time-temperature superposition is, therefore, driven by the properties of the swatch. It should be noted, however, that such superposition should not be applied to the storage modulus for the steel beam/composite swatch system and will not be shown. Only time temperature superposition analysis of E" will be carried out on the three point bending data. Because the dynamic storage modulus for steel largely dominates the effective E' for the system, although swatch properties may have a significant effect on this value, it is difficult to rigorously define an exact time-temperature superposition for tan δ. In order to provide appropriate relative comparisons, however, an effective tan δ is defined as $$\tan\delta = \frac{E''_{master}(f, T_{ref})}{E'_{eff}(f_{scaled})},$$

where $E'_{eff}(f_{scaled})$ is the non-temperature scaled effective storage modulus for the system at a particular scaled frequency, and $E''_{master}(f, T_{ref})$ is the value of the derived dynamic loss modulus master curve at a particular frequency.

In addition, care was taken in the production of all time temperature superposition master curves to apply the method only across a temperature range in which time temperature superposition is generally accepted as applicable. In particular, phase transitions resulting in discontinuous changes in master curve character were not knowingly crossed in the construction of a master curve. In addition, care was taken to insure that the material response was dominated only by the damping component of the structure, such that the validity of time-temperature analysis holds.

EXAMPLE 1

A composite material was fabricated from two individual components. The first component was a viscoelastic damping material sold by the E.I. DuPont deNemours Co. as a PTFE solvent (designated as TE-5039A). Chemically, this damping material is an oligomeric perfluorocarbon compound having an oligomer molecular weight distribution largely determined by the manufacturing and separation process employed in its production and purification. The specific lot of material employed for the purposes of this example (lot number 59420-2) possesses a glass transition temperature of approximately 2.3° C. (as determined through DMA analysis by DuPont). At room temperature this oligomer will slowly flow to fill any vessel in which it is contained over a period of hours. At elevated temperatures (on the order of approximately 50 degrees celsius) the substance becomes much more fluid and may be easily poured. In addition, the fluid has a contact angle with PTFE which is less than 90 degrees and will spontaneously wet open cell porous PTFE materials. Although this material possesses high dynamic loss characteristics and is ideally suited for damping purposes, it is mechanically unstable with respect to cold flow, having an average measured droop time of 47.3 seconds (average of 7 replicates carried out according to test method number 3, the standard deviation for this data set was 3.27 seconds). As such, this material is unsuitable for use in most practical damping applications and must be stabilized for routine application.

Figure 17:
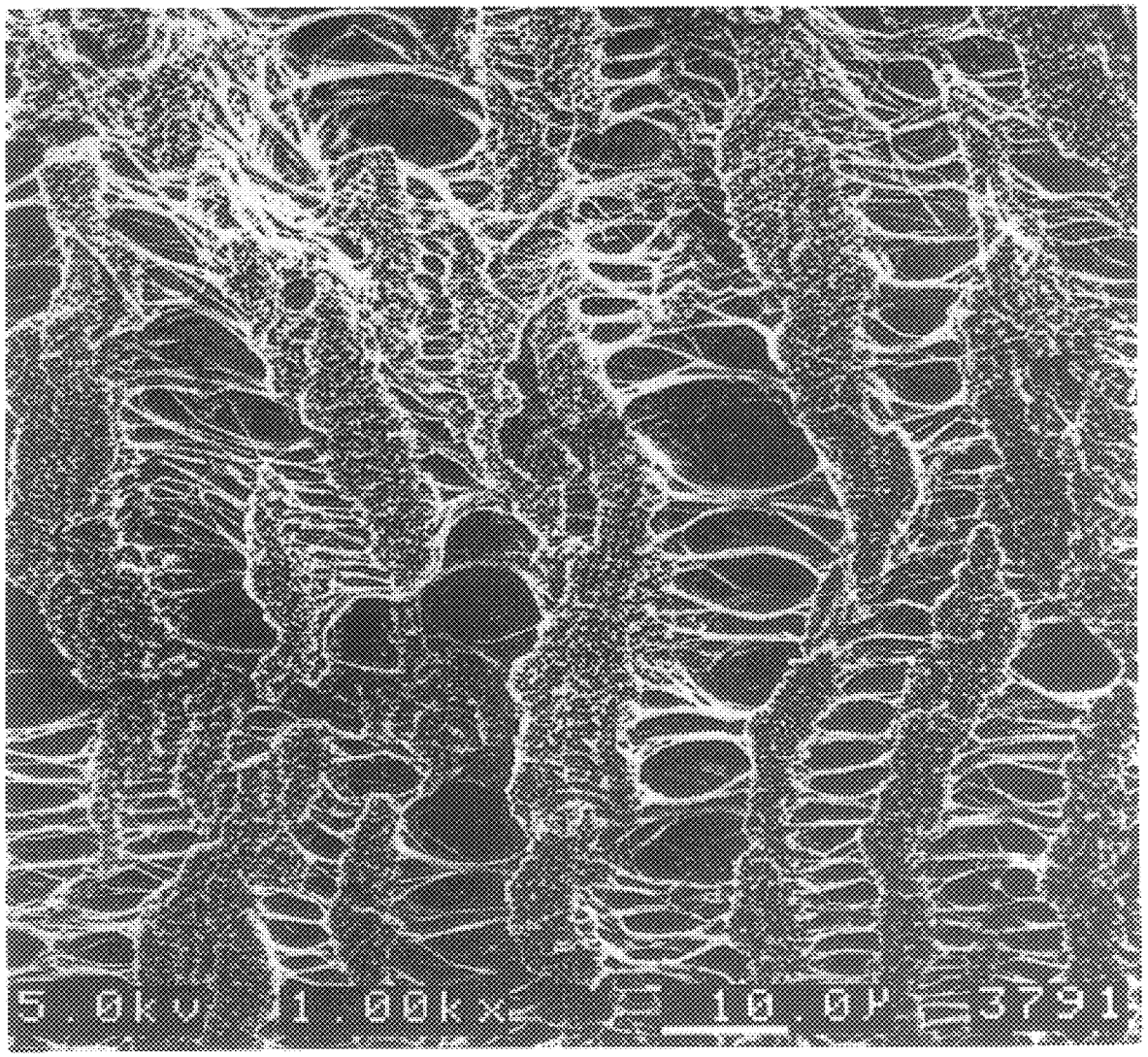
FIG. 17 is a scanning electron micrograph showing the microporous structure of the expanded PTFE tape used in Examples 1–3. Notice the complex structure of nodes interconnected by fibrils. Also notice that the rough scale of these structures is on the order of 10 μm.

The second component comprising the finished composite material was an expanded porous PTFE tape manufactured according to the teachings of U.S. Pat. No. 3,953,566. This porous tape has a large open cell void content. The bulk density of this tape was measured to be 0.265 grams/cc (average of 6 replicates with a standard deviation of 0.005 grams/cc). The tape thickness was measured to be 1.455 mm (average of 6 replicates, standard deviation of 0.023 mm), yielding an average unit weight of $3.83 \times 10^{-2}$ g/cm$^2$. The longitudinal matrix tensile strength of the tape, according to ASTM test method D-638-95, was measured to be 25.5 Kpsi is (average of 5 replicates, standard deviation 1.16 Kpsi), while the transverse MTS was measured to be 3.81 Kpsi (average of 5 replicates, standard deviation of 400 psi). FIG. 17 shows a scanning electron micrograph of the internal porous structure of this material revealing a complex microporous internal node and fibril structure.

A composite of these two components was fabricated through wetting of the porous PTFE tape with the fluoro-oligomer at temperature of 150° C. The PTFE tape was first restrained on a frame by its edges to prevent contraction at high temperature. A container filled with the oligomer, was then heated in an oven at 150° C. until the oligomer was pourable. The oligomer was then poured directly onto the surface of the PTFE tape and allowed to wet into the pores of the material. The restrained material was then heated to a temperature of 150° C., allowing the oligomer to fully wick into the pore structure of the PTFE tape. The composite was then allowed to cool at room temperature, completing the fabrication process. The final bulk density of the composite was measured to be 2.069 g/cc (average of 6 replicates, standard deviation 0.039 g/cc). The final composite thickness was measured to be 1.45 mm (average of 6 replicates, standard deviation 0.0258 mm) yielding a unit weight (mass per unit area) of 0.319 g/cm$^2$.

The stability of this material was examined over long periods of time at ambient and elevated temperature. The oligomer was observed to be stable within the material, with no separation or flow of the damping component from within the composite, at ambient temperatures over a period of several months. In addition, the material was observed for periods of up to one hour at temperatures in excess of 70° C. without separation of flow of the damping component from within the composite. The composite, therefore, was qualitatively observed to be extremely stable with respect to cold flow.

In addition, the stability of the composite was examined through determination of mechanical droop displacement via test method number 4. The average droop displacement of the composite was measured to be 0.285 mm (average of 3 replicates, standard deviation 0.085 mm), indicating a high level of resistance to cold flow.

Figure 18:
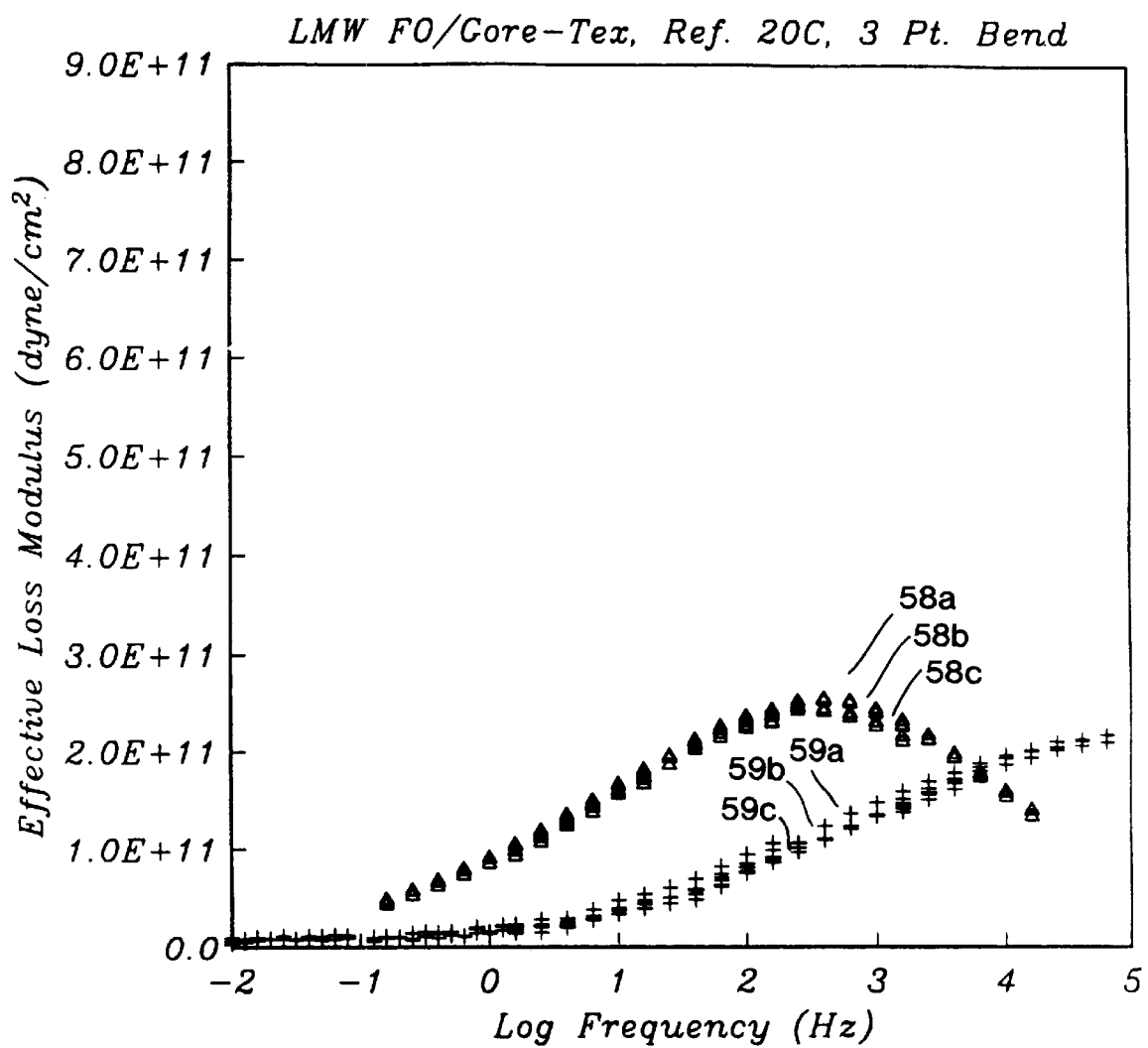
FIG. 18 provides a time-temperature master curves at a reference temperature of 20° C., constructed using analysis method number 1, for effective dynamic loss modulus for the steel beam bonded system, measured using test method number 1. Shown are three replicate master curves for the composite material of Example 1 (comprised of ePTFE and a low molecular weight version of a fluoro-oligomer), and three replicate master curves for a commercia copolymer material described in Example 1.

Swatches of the composite material were cut for bonding to steel beams and subsequent 3 point bending testing using test method number 1. The swatches were bonded to appropriate steel beams by heating a very small amount of the fluoro-oligomer to a liquid state, coating a very thin layer onto the surface of the steel beam, and laying a cool swatch onto the warm oligomer layer. Upon cooling, a good temporary bond was achieved between the swatch and metal surface. Three steel beam samples were constructed in this fashion and tested, following test method number 1, at temperatures of −10, 0, 10, 20, 30 and 40° C. A time temperature superposition analysis was then carried out, using analysis method number 1, to produce 3 replicate master curves for the effective E" at a reference temperature of 20° C. For reference, a similar series of measurements was also carried out on a damping material commercially available from the Minnesota Mining and Manufacturing Co. under the trade name ISD110. This 3M material possesses well known excellent damping properties. Three replicates were carried on this material at temperatures of −10, 0, 10, 20, 30, and 40° C. Three replicate time temperature superposition master curves were also constructed for this material at a reference temperature of 20° C. using analysis method number 1. These time-temperature master curves are shown in FIG. 18, where lines 58*a*, 58*b*, and 58*c* show the effective E" for the damping swatches constructed in this example, and lines 59*a*, 59*b*, and 59*c* show the effective E" for the 3M material.

Figure 19:
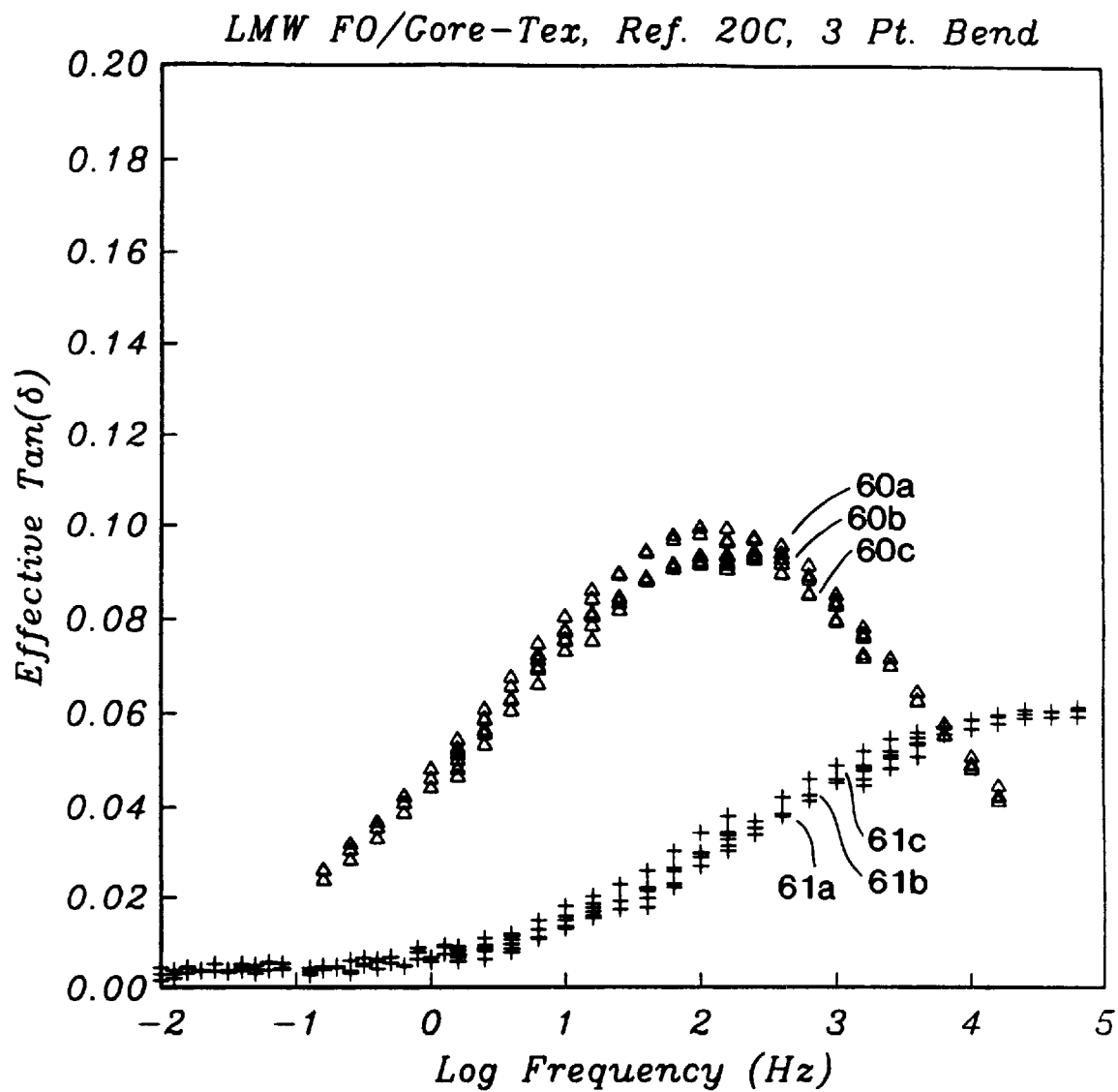
FIG. 19 shows time-temperature master curves at a reference temperature of 20° C., constructed using analysis method number 1, for effective tan δ for the steel beam bonded system, measured using test method number 1. Shown are three replicate master curves for the composite material comprised of ePTFE and a low molecular weight version of a fluoro-oligomer, and three replicate master curves for a commercially available acrylic copolymer material.

The master curve for the effective dynamic loss modulus of the PTFE/fluorooligomer composite is observed to be well in excess of that of the 3M material across the frequency band from 1 to $10^4$ Hz. Effective dynamic loss modulus across this band is seen to be in excess of $1.0 \times 10^{11}$ dyne/cm$^2$. This indicates excellent damping performance across the band of frequency from 1 to $10^4$ Hz at 20° C. Effective tan δ master curves are also shown in FIG. 19, where lines 60*a*, 60*b*, and 60*c* show the effective tan δ for the damping swatches constructed in this example, and lines 61*a*, 61*b*, and 61*c* show the effective tan δ for the 3M material. Note that the PTFE/fluoro-oligomer composite demonstrates an effective tan δ greater than 0.03 from 0 to $10^4$ Hz. In addition, this damping performance is achieved in a composite material with demonstrated mechanical stability with respect to cold flow.

Figure 20:
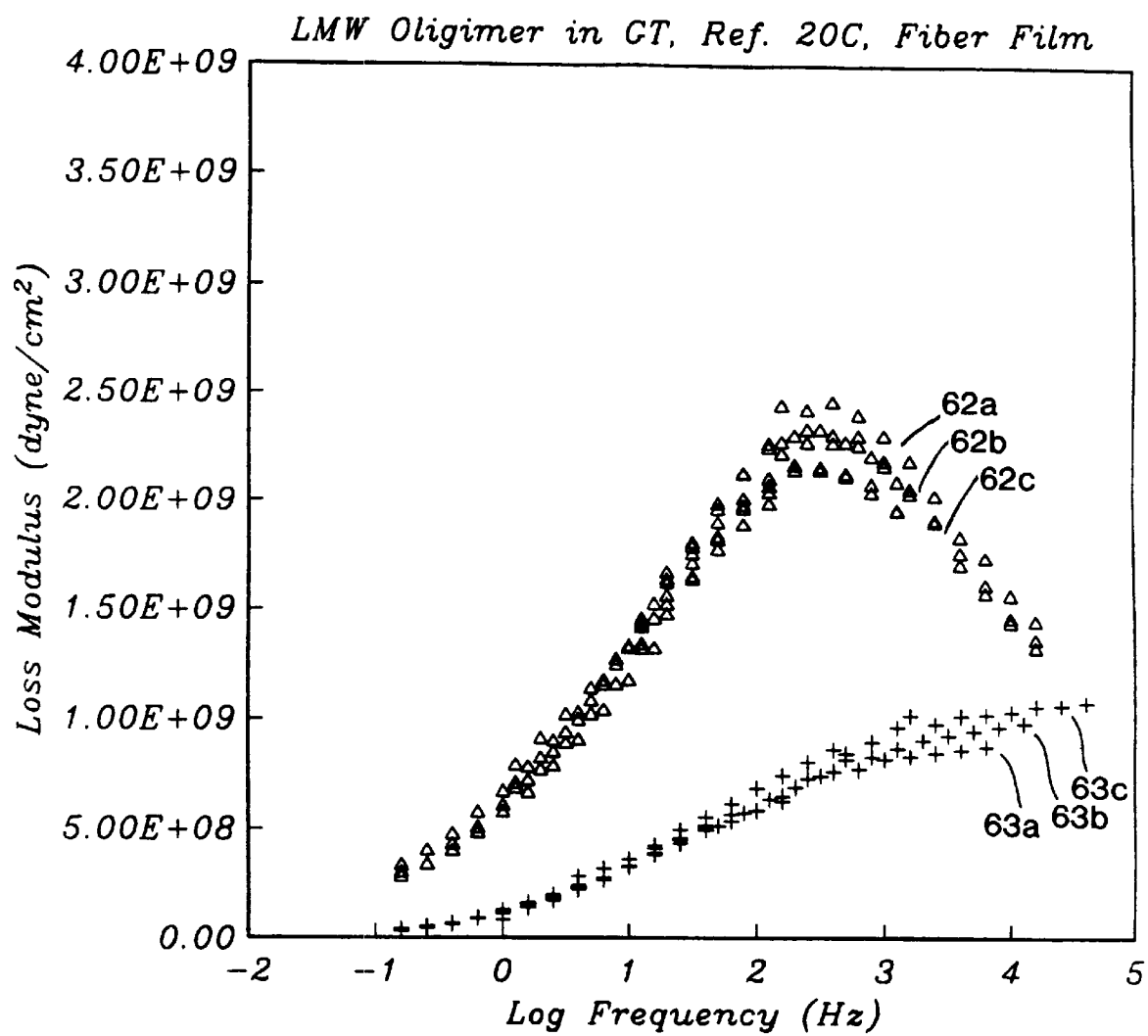
FIG. 20 shows time-temperature master curves at a reference temperature of 20° C., constructed using analysis method number 1, for dynamic loss modulus in fiber film geometry, measured using test method number 2. Shown are three replicate master curves for the composite material comprised of ePTFE and a low molecular weight version of a fluoro-oligomer, and three replicate master curves for a commercially available acrylic copolymer material.
Figure 21:
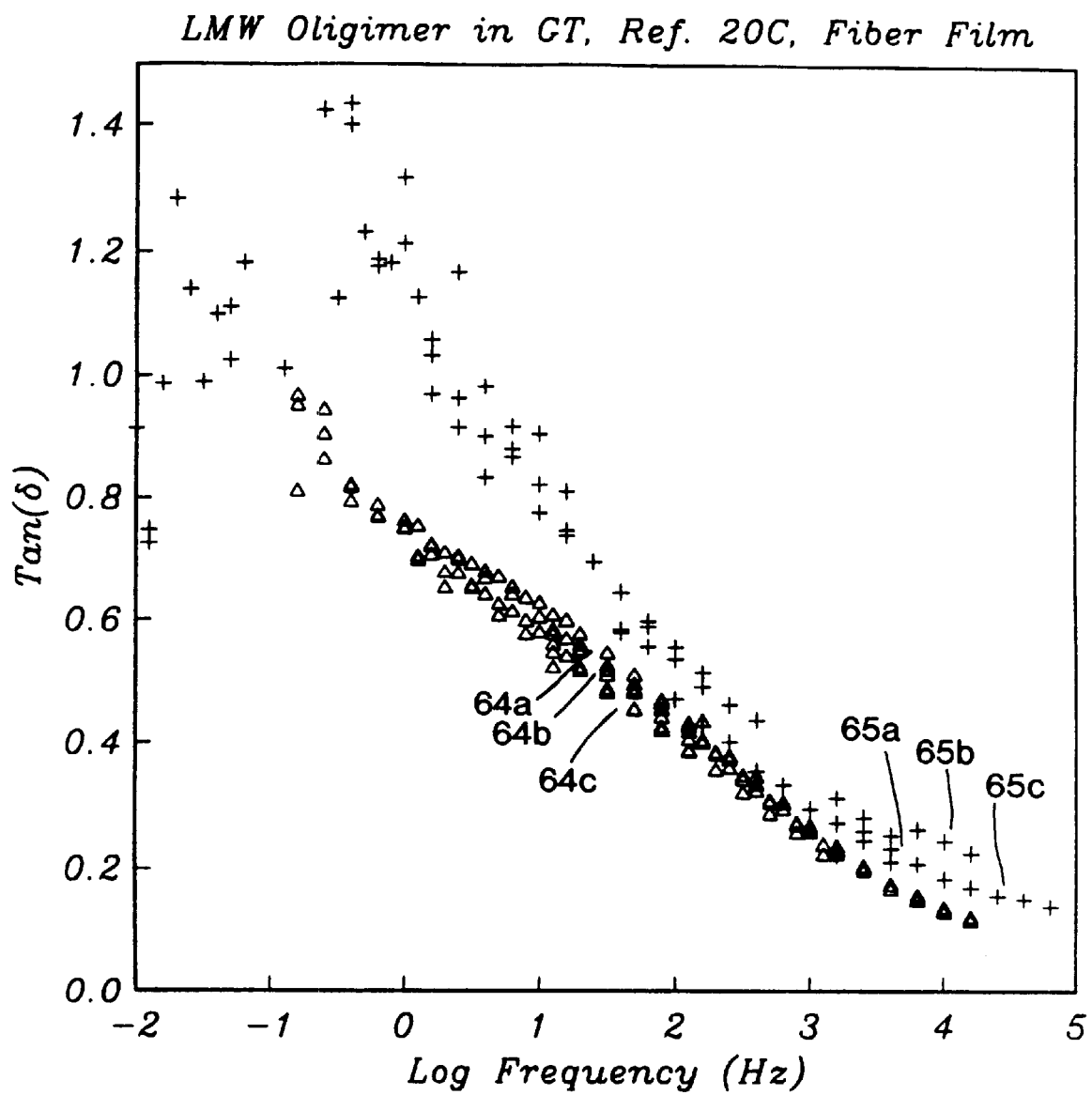
FIG. 21 shows time-temperature master curves at a reference temperature of 20° C., constructed using analysis method number 1, for tan δ in fiber film geometry, measured using test method number 2. Shown are three replicate master curves for the composite material comprised of ePTFE and a low molecular weight version of a fluoro-oligomer, and three replicate master curves for commercially available acrylic copolymer material.

Fiber film testing was also carried out on the PTFE fluoro-oligomer composite and the 3M damping material, according to test method number 2, at exactly the same temperatures. Three replicate E" time-temperature superposition master curves were then constructed at a reference temperature of 20° C., following analysis method number 1, for both the 3M material and the oligomer composite. FIG. 20 shows the comparison between the resulting master curves, where lines 62*a*, 62*b*, and 62*c* show the E" for the damping swatches of this example, and lines 63*a*, 63*b*, and 63*c* show the E" for the 3M materials. As expected, the trends are nearly identical to those achieved using the three point bending analysis. Again, the composite material of the invention displays excellent damping performance from 1 to $10^4$ Hz, with loss modulus above $1.0 \times 10^9$ dyne/cm$^2$, in a stable mechanical form. FIG. 21 shows corresponding tan δ values, demonstrating values of approximately 0.1 up to $10^4$ Hz for the damping material of this example shown in lines 64*a*, 64*b*, and 64*c*. (Note that the tan δ for the 3M materials are shown in lines 65*a*, 65*b* and 65*c*.)

EXAMPLE 2

In order to demonstrate the ability to tailor composite properties through manipulation of the viscoelastic component, a second composite was fabricated using identically the same expanded PTFE tape as in example number 1, but a different molecular weight fluoro-oligomer was used as the damping component. Again, the oligomer used is designated as TE-5039A by the E.I. DuPont deNemours Co., but a different lot (lot number 59450) was chosen due to its apparent higher molecular weight. The glass transition of this material, as determined by DuPont, was 9.1° C., significantly higher than that of the oligomer used to fabricate Example 1. As might be expected, the higher glass transition temperature signifies much greater mechanical stability with respect to cold flow. The material in pure form, however, is still far too unstable for application in typical damping scenarios, and will flow to conform to any vessel in which it is contained (at room temperature) within a few days. Quantitatively, this version of the oligomer possesses an average droop time of 5070 seconds (5 replicates with a standard deviation of 327 seconds), via test method number 3. This indicates a material far too unstable for stand alone application, although it is significantly less susceptible to cold flow than the oligomer used in Example 1.

As is also be expected from the higher glass transition temperature, this version of the oligomer possesses different damping properties than that of the oligomer employed in Example 1. In particular, this higher molecular weight material has considerably longer relaxation times at a given temperature, translating into better damping performance at lower frequencies. As the data to be presented will demonstrate, the use of this material dramatically shifts the frequency at which peak damping performance (peak E") is observed to much lower values. This demonstrates the ability to tailor composite properties, through selection of damping component characteristics.

Although somewhat different in pourability from the oligomer used in Example 1, the higher molecular weight material may be imbibed within expanded PTFE structures using exactly the same procedure employed in the fabrication of Example 1. For the purposes of the present example, this exact procedure was used without change, to imbibe expanded PTFE cut from the same roll of tape as was used in the first example. In every respect excepting the lot and corresponding properties of the oligomer, therefore, the fabrication of this example was identical to that of Example 1. The final bulk density of the composite was measured to be 2.081 g/cc (average of 6 replicates, standard deviation 0.055 g/cc). The final composite thickness was measured to be 1.62 mm (average of 6 replicates, standard deviation 0.021 mm) yielding a unit weight (mass per unit area) of 0.337 g/cm$^2$.

The stability of the resulting composite was examined over long periods of time at ambient and elevated temperature. The oligomer was observed to be stable within the material, with no separation or flow of the damping component from within the composite, at ambient temperatures over a period of several months. In addition, the material was observed for periods of up to one hour at temperatures in excess of 70° C. without separation or flow of the damping component from within the composite. The composite, therefore, was qualitatively observed to be extremely stable with respect to cold flow. Analytically, the stability of the composite was examined through determination of mechanical droop displacement via test method number 4. The average droop displacement of the composite was measured to be 0.58 mm (2 replicates with standard deviation of 0.17 mm), indicating a high level of resistance to cold flow.

Figure 22:
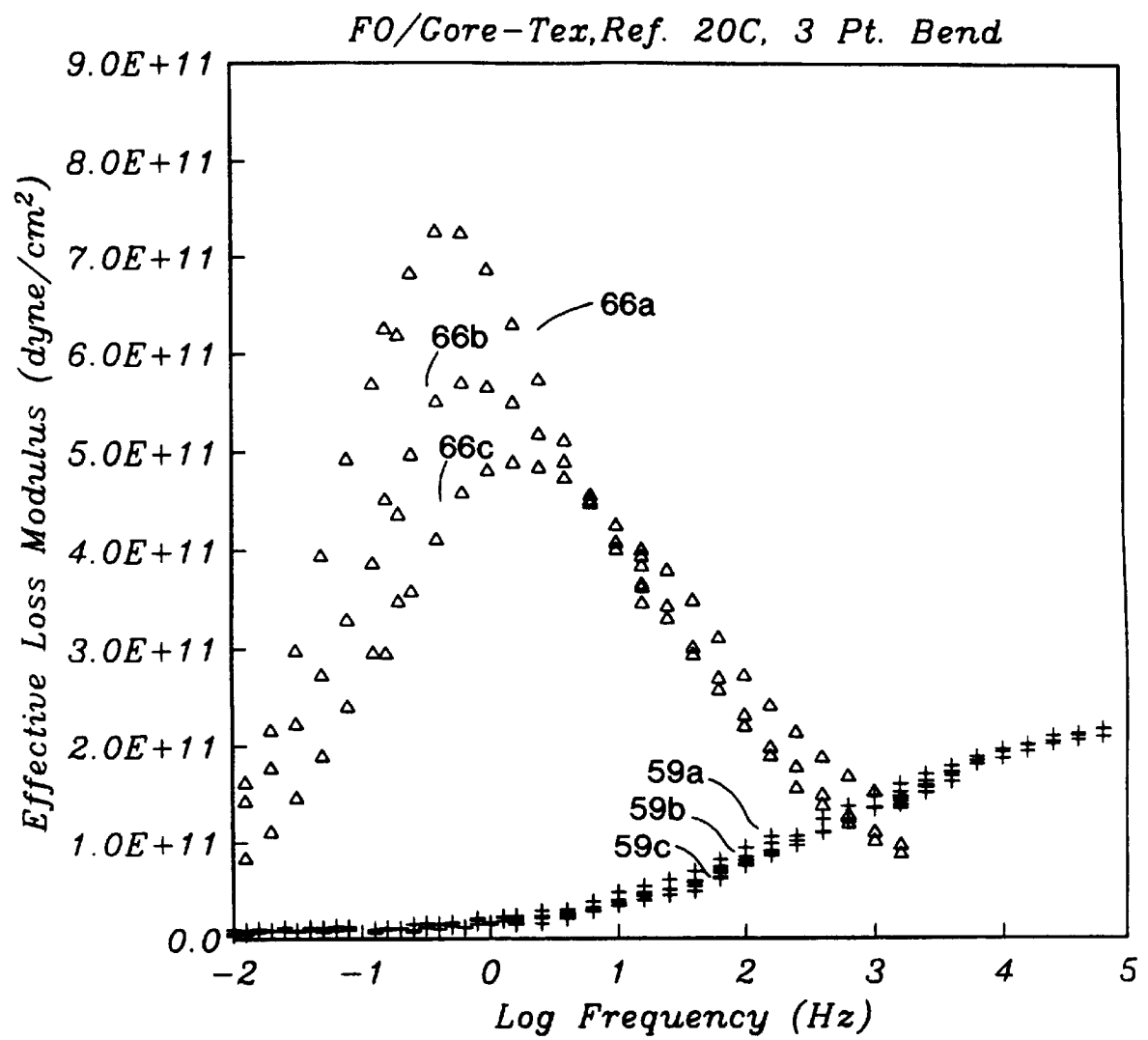
FIG. 22 is described in Example 2 and shows time-temperature master curves at a reference temperature of 20° C., constructed using analysis method number 1, for effective dynamic loss modulus for the steel beam bonded system, measured using test method number 1. Shown are three replicate master curves for the composite material comprised of ePTFE and a high molecular weight version of a fluoro-oligomer, and three replicate master curves for a commercially available acrylic copolymer material.
Figure 23:
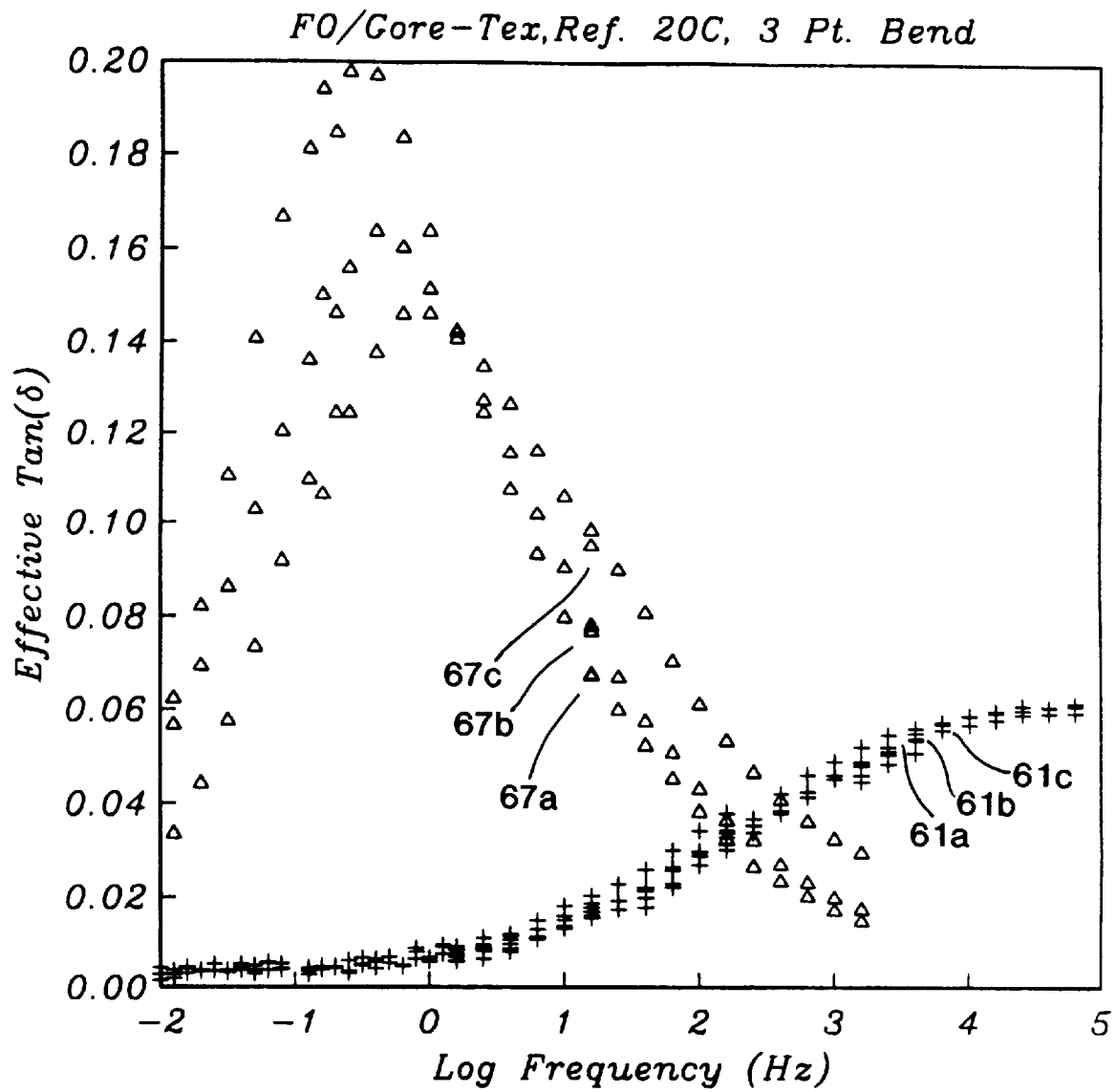
FIG. 23 shows time-temperature master curves at a reference temperature of 20° C., constructed using analysis method number 1, for effective tan δ for the steel beam bonded system, measured using test method number 1. Shown are three replicate master curves for the composite material comprised of ePTFE and a high molecular weight version of a fluoro-oligomer, and three replicate master curves for a commercially available acrylic copolymer material.
Figure 24:
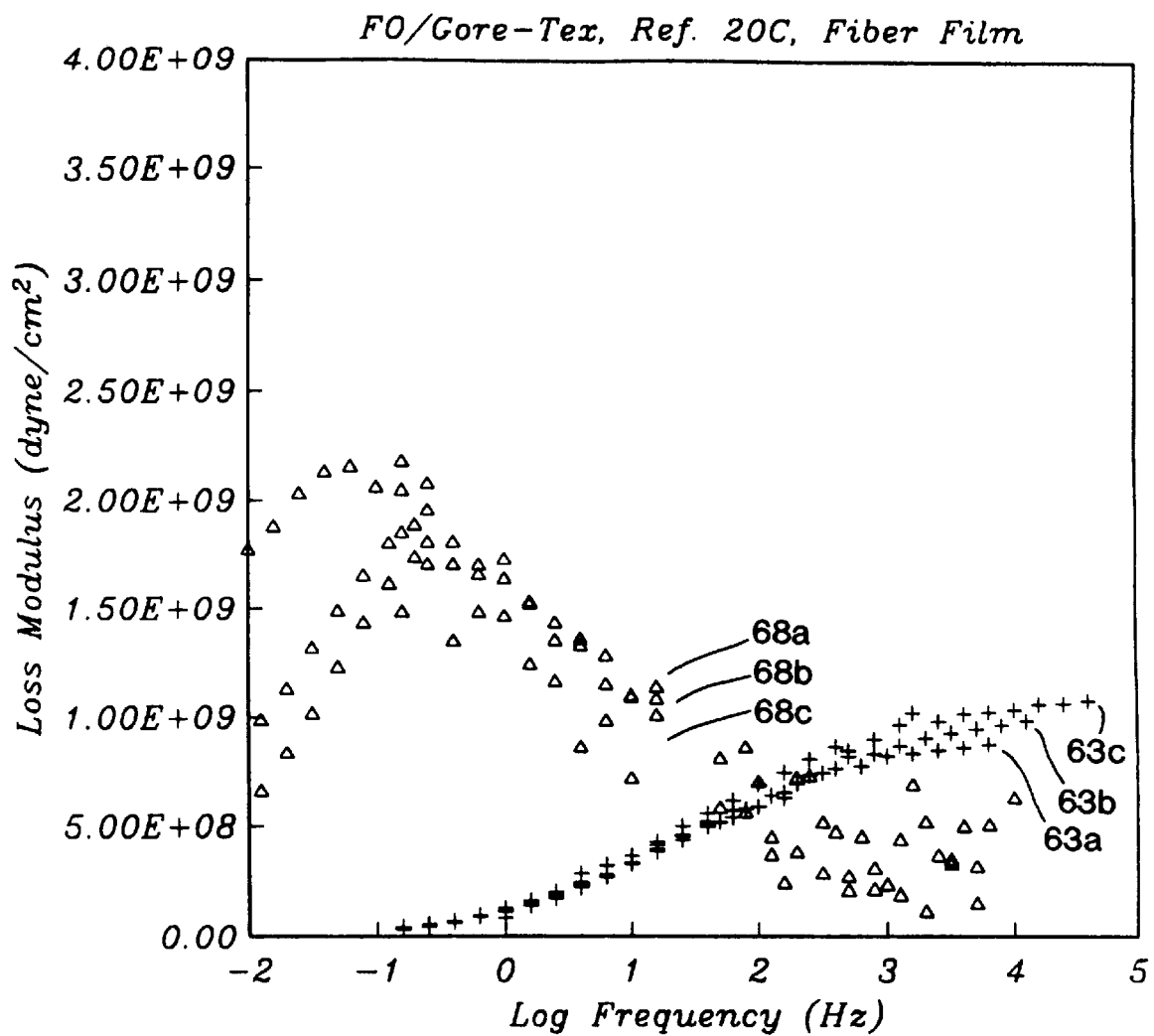
FIG. 24 shows time-temperature master curves at a reference temperature of 20° C., constructed using analysis method number 1, for dynamic loss modulus in fiber film geometry, measured using test method number 2. Shown are three replicate master curves for the composite material comprised of ePTFE and a high molecular weight version of a fluoro-oligomer, and three replicate master curves for a commercially available acrylic copolymer material.
Figure 25:
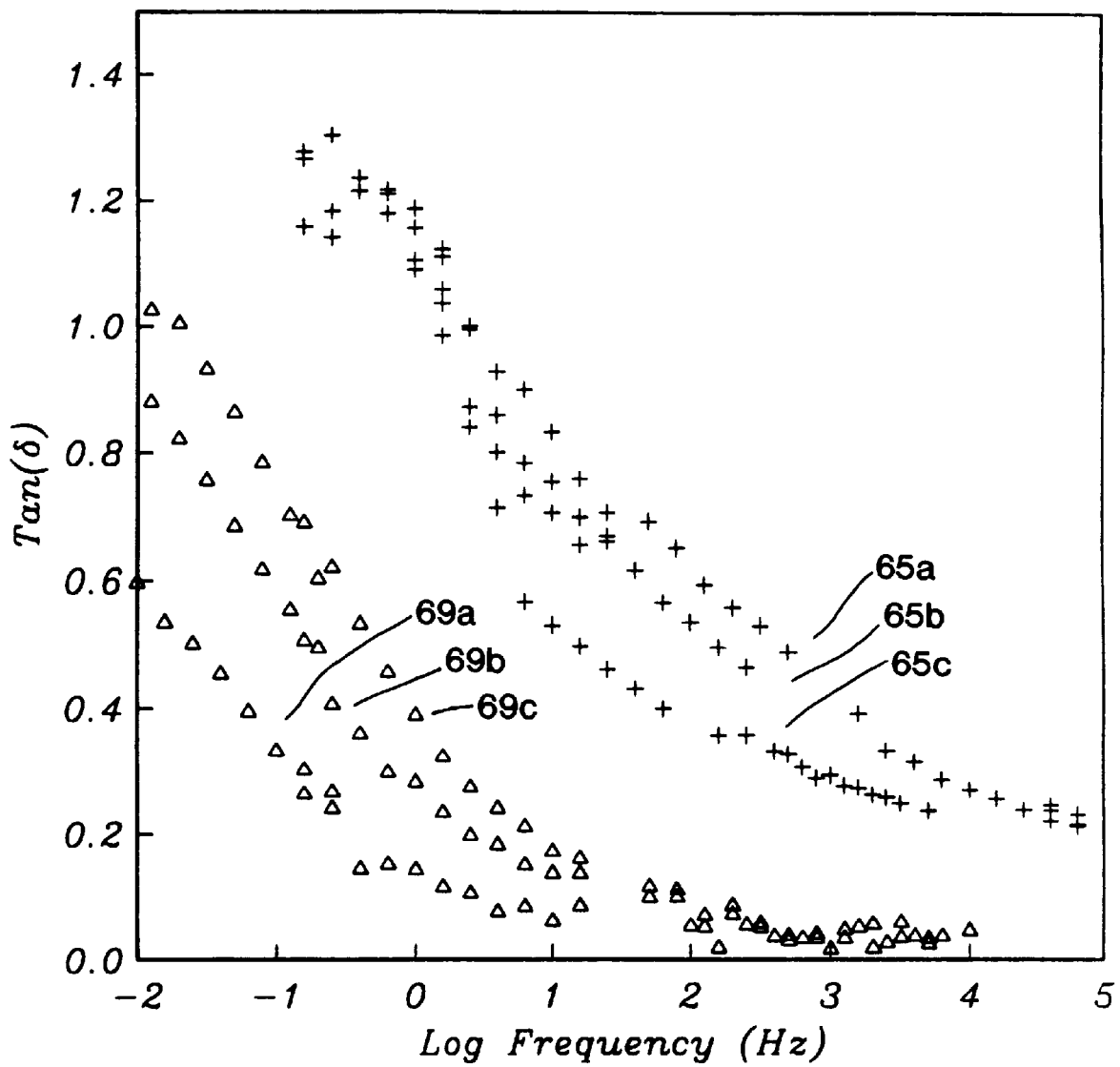
FIG. 25 shows time-temperature master curves at a reference temperature of 20° C., constructed using analysis method number 1, for tan δ in fiber film geometry, measured using test method number 2. Shown are three replicate master curves for the composite material comprised of ePTFE and a high molecular weight version of a fluoro-oligomer, and three replicate master curves for a commercially available acrylic copolymer material.

A battery of rheological tests and analysis, identical to those used to characterize Example 1, were performed on this composite. Again, the only difference between this and the previous example is the use of the higher molecular weight oligomer, both in the composite itself, and in bonding of samples to steel beams for 3 point bending tests. In all other respects (temperatures, procedures, etc.) the testing and analysis were identical. FIG. 22, lines 66a, 66b, and 66c, shows the resulting three replicate effective E" master curves, for the material of this example, obtained using test method 1 and analysis 1. Also shown are the three replicate master curves, lines 59a, 59b, and 59c, for the 3M ISD110 material shown previously. The composite is seen to possess damping well in excess of the ISD110 at low frequencies. Across the entire band from 0.01 Hz up to approximately 100 Hz, the effective E" exceeds $1 \times 10^{11}$ dyne/cm$^2$, with peak performance at approximately 0.1 Hz. FIG. 23, lines 67a, 67b, and 67c, shows the corresponding effective tan δ master curves for the material of this example, in comparison to the ISD110 results of lines 61a, 61b, and 61c, demonstrating values greater than 0.03 from 0.01 to 100 Hz. Fiber film results, obtained using test method 2 and analysis method 1, are shown in FIGS. 24 and 25. FIG. 24 shows loss modulus master curves for the material of this example in lines 68a, 68b, and 68c, and the 3M material shown previously in lines 63a, 63b, and 63c. FIG. 25 shows tan δ master curves for the material of this example in lines 69a, 69b, and 69c, and the 3M material shown previously in lines 65a, 65b, and 65c. These results generally track those obtained in 3 point bending with E" in excess of $5 \times 10^8$ and tan δ in excess of 0.02 from 0.01 to 100 Hz.

These results indicate that this composite possesses excellent damping performance across the relatively low frequency band from 0.01 to 100 Hz. Although these frequencies are somewhat low for typical applications, the performance of this composite, incorporating the higher molecular weight version of the oligomer, demonstrates the ability to tailor damping performance through manipulation of the damping component. Specifically, through simple adjustment of oligomer molecular weight, the frequency at which peak damping performance is obtained can be altered by more than three orders of magnitude. As one skilled in the art will recognize, these results conclusively demonstrate the ability to continuously manipulate peak performance over this band through simple mixing of oligomer fractions. On the same principle, peak performance may even be adjusted to match specific resonant frequencies in the system to be damped.

In addition, the damping performance outlined above is achieved in a stable, coherent, mechanical form suitable for use in a variety of applications. Although the damping component of the composite is inherently unstable with respect to cold flow, stabilization of this material within a porous scaffold has been accomplished to allow practical application.

EXAMPLE 3

In order to demonstrate the ability to stabilize a variety of materials with different chemical and physical properties through entrapment within a porous scaffold, a third composite material was fabricated from two individual components. The first component was a viscoelastic damping material sold by Dow Chemical Company (designated as DEN438) as a raw, uncured, epoxy resin. The second material was identically the same ePTFE tape used in the first example. Chemically, the damping material is an uncured novolac epoxy. The specific lot of material employed for the purposes of this example was No. KA0501M101. This material is essentially a viscous liquid at ambient and elevated temperatures. At room temperature, the material will slowly flow to fill any vessel in which it is contained over a period of hours. At elevated temperatures (on the order of 100 degrees C.) the material becomes much more fluid and may be easily poured. This fluid, even at high temperature, makes a contact angle with PTFE which is greater than 90°, preventing spontaneous wetting of porous PTFE materials. The high dynamic loss modulus and tan δ of this material at ambient temperature gives it excellent damping properties, although it is difficult to directly employ in practical applications due to cold flow. Analytically, the average mechanical droop time, as determined via test method number 3, was measured to be 124 seconds (average of 8 replicates, standard deviation 6.29 seconds). This indicates that this epoxy is extremely unstable with respect to cold flow, and requires stabilization for practical application in most damping scenarios. Because the epoxy material is non wetting in porous PTFE structures, a composite cannot be fabricated via the wetting procedure employed in the fabrication of example No. 1. In this case, a PTFE wetting solvent was employed to dissolve the epoxy and to wet the mixture into the pore structure of the ePTFE tape. The solvent was then dried away at high temperature leaving the epoxy within the ePTFE structure. This procedure was then repeated until the desired loading of epoxy was achieved within the porous ePTFE tape. The solvent employed for the purpose of imbibing the epoxy within the tape was acetone. A 20 percent mixture of epoxy by weight in acetone was first mixed at ambient temperature via simple stirring. To prevent shrinkage of the PTFE tape upon drying, a swatch of the material was restrained on a frame. The solution was then placed in a vacuum container and the PTFE tape was placed within the fluid. To eliminate air entrapment within the porous structure of the tape, a vacuum was then pulled on the system (to approximately 29 inches of vacuum). The tape, while immersed in the DEN438-acetone solution, was then held under vacuum for approximately 30 seconds and the material was removed and air dried. This procedure was repeated a total of 7 times. To drive off any residual acetone, the material was heated to 150° C. for 30 minutes. The composite was then cooled to ambient temperature completing the fabrication process. The final bulk density of the composite was measured to be 1.079 g/cc (average of 12 replicates, standard deviation 0.0234 g/cc). The final composite thickness was measured to be 1.51 mm (average of 12 replicates, standard deviation 0.00962 mm) yielding a unit weight (mass per unit area) of 0.163 g,cm$^2$.

Figure 26:
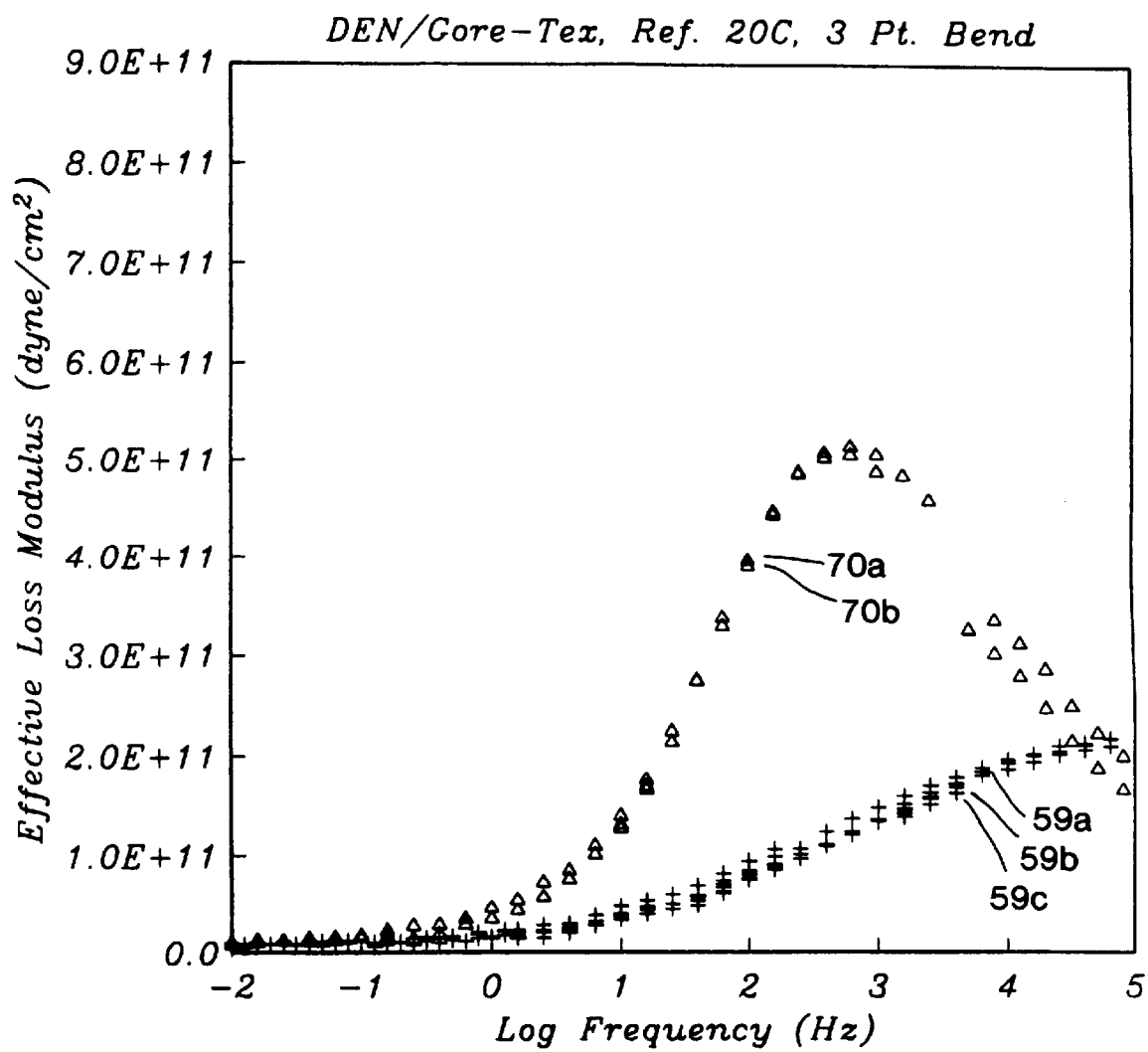
FIG. 26 is described in Example 3 and depicts time-temperature master curves at a reference temperature of 20° C., constructed using analysis method number 1, for effective dynamic loss modulus for the steel beam bonded system, measured using test method number 1. Shown are three replicate master curves for the composite material comprised of ePTFE and an epoxy resin, and three replicate master curves for a commercially available acrylic copolymer material.
Figure 27:
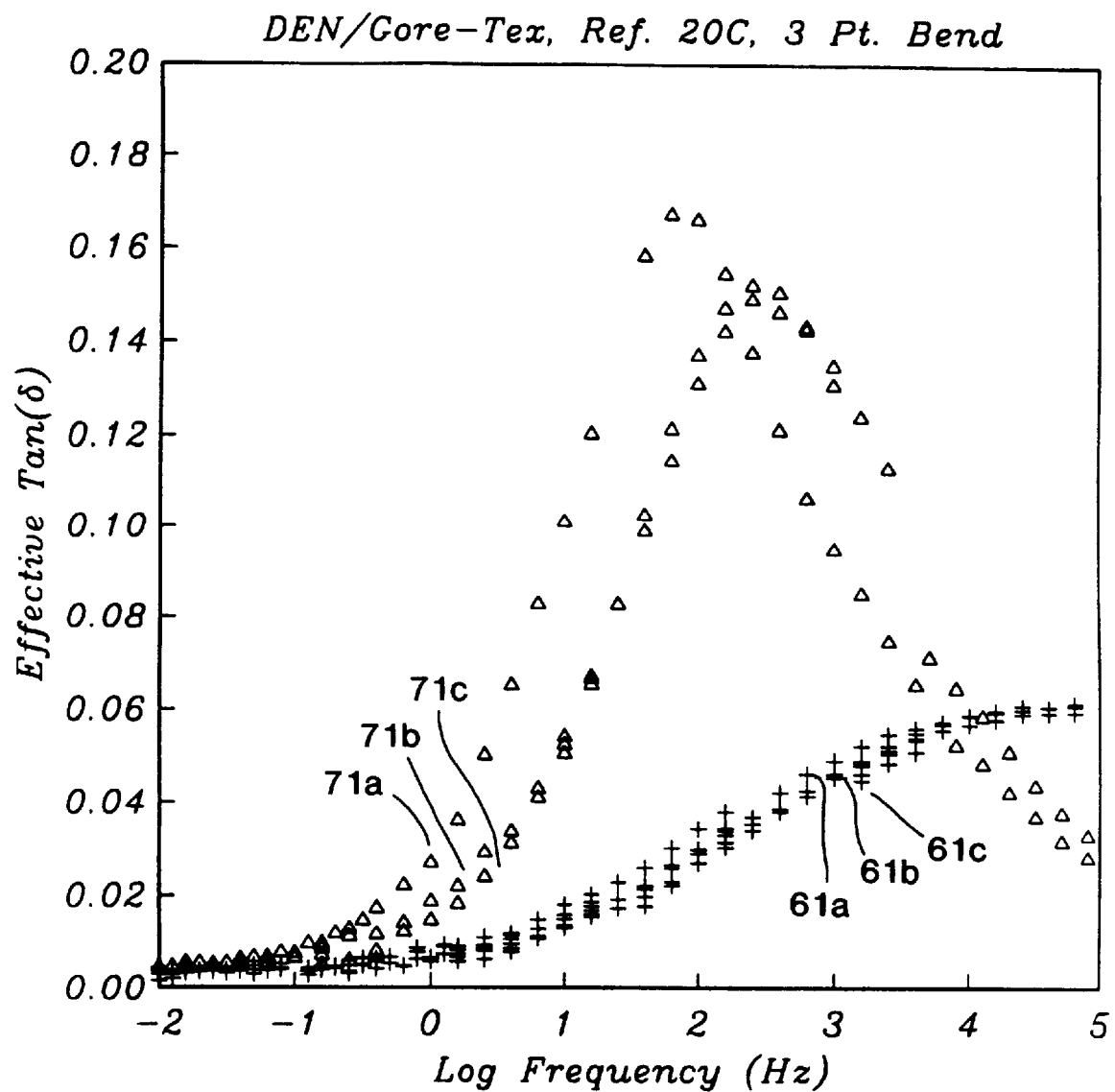
FIG. 27 shows time-temperature master curves at a reference temperature of 20° C., constructed using analysis method number 1, for effective tan δ for the steel beam bonded system, measured using test method number 1. Shown are three replicate master curves for the composite material comprised of ePTFE and an epoxy resin, and three replicate master curves for a commercially available acrylic copolymer material.

The stability of the final epoxy-PTFE composite material was examined over long periods at ambient temperature (at approximately 22° C.). Although the epoxy is non wetting and is capable of flow at these temperatures, no separation or flow of the epoxy from within the structure was observed. In addition, the stability of the material at high temperature, up to 130° C., was also examined. The material was also found to stable at these temperatures for times up to approximately one hour. The composite, therefore, although comprised of an open pore structure and non-wetting fluid-like filler, is permanently stable and resistant to the effects of cold flow. Quantitatively, the average droop displacement, as measured via test method number 4, was found to be 0.253 mm (average of 2 replicates, standard deviation of 0.0799 mm). This value provides additional evidence that the composite is extremely stable with respect to cold flow, and is suitable for most applications. Swatches of the composite material were cut for bonding to steel beams and subsequent 3 point bending testing using test method number 1. The swatches were bonded to appropriate steel beams by coating a very small amount of the DEN438 material onto the surface of the steel beam, and laying a swatch onto the layer. The beam was then slightly heated, to approximately 50° C. for a few minutes to create an acceptable bond. Upon cooling, a good temporary bond was achieved between the swatch and metal surface. Three steel beam samples were constructed in this fashion and tested, following test method number 1, at temperatures of −10, 0, 10, 20, 30, and 40° C. A time temperature superposition analysis was then carried out, using analysis method number 1, to produce a master curve for the effective E" at a reference temperature of 20° C. The resulting master curve, in comparison to that obtained for the 3M material at the same reference temperature, is shown in FIG. 26 (Note that lines 70a and 70b show the effective E" value for the material of this example). The corresponding effective tan δ master curve is shown in FIG. 27, where lines 71a, 71b, and 71c show the material of this example.

The master curve for the effective dynamic loss modulus of the epoxy-PTFE composite is observed to be well in excess of that of the 3M material well into the acoustic band of frequencies (greater than $2.0 \times 10^{11}$ from 100 to $10^4$ Hz). In addition, the effective tan δ is above 0.05 across this same band. This indicates excellent damping performance across this large band of frequency at 20° C. In addition, this damping performance is achieved in a composite material with demonstrated mechanical stability with respect to cold flow, even at elevated temperatures.

Figure 28:
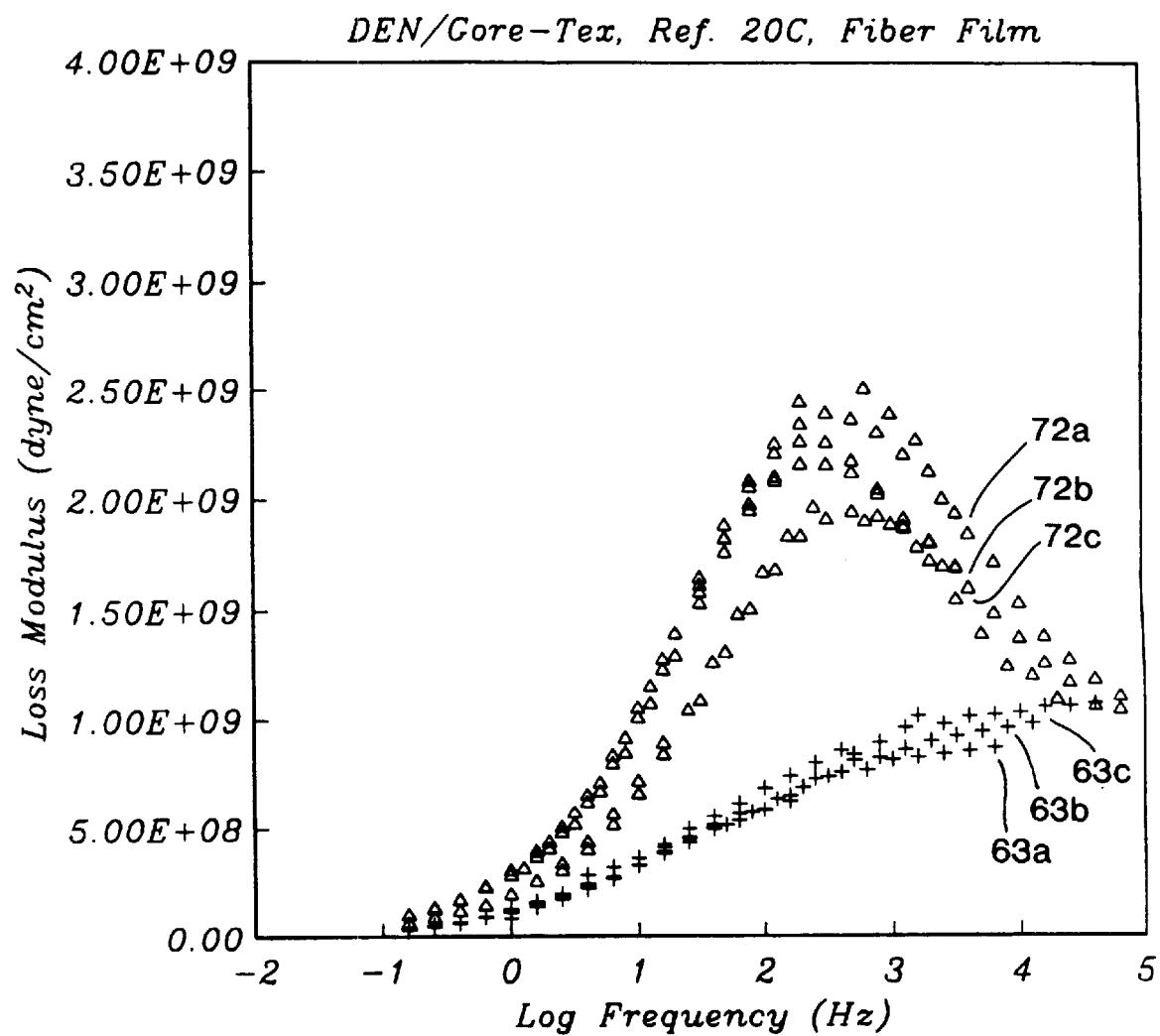
FIG. 28 shows time-temperature master curves at a reference temperature of 20° C., constructed using analysis method number 1, for dynamic loss modulus in fiber film geometry, measured using test method number 2. Shown are three replicate master curves for the composite material comprised of ePTFE and an epoxy resin, and three replicate master curves for a commercially available acrylic copolymer material.
Figure 29:
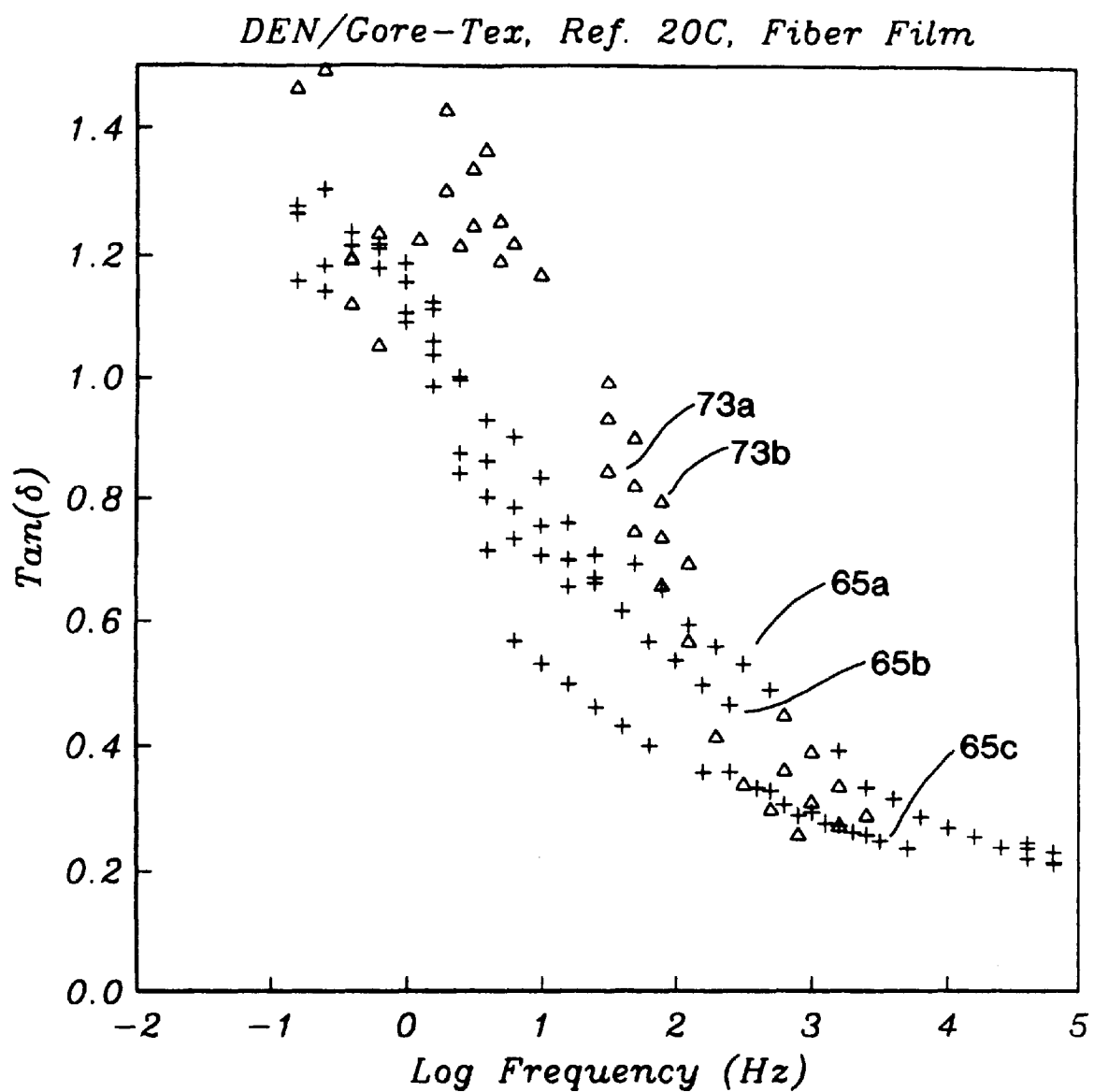
FIG. 29 shows time-temperature master curves at a reference temperature of 20° C., constructed using analysis method number 1, for tan δ in fiber film geometry, measured using test method number 2. Shown are three replicate master curves for the composite material comprised of ePTFE and an epoxy resin, and three replicate master curves for a commercially available acrylic copolymer material.

Fiber film testing was also carried out on the epoxy-PTFE composite, according to test method number 2, at exactly the same temperatures. An E" time-temperature superposition master curve at a reference temperature of 20° C. was then constructed, following analysis method number 1. FIG. 28 shows the comparison between this master curve (lines 72a, 72b and 72c) and that obtained for the 3M material (lines 63a, 63b, and 63c). FIG. 29 shows the corresponding tan δ master curves, where lines 73a and 73b show the material of this example, and lines 65a, 65b, and 65c show the 3M material. The composite material displays a loss modulus in excess of $1.0 \times 10^9$ dyne/cm$^2$ from 100 to $10^4$ Hz, and a tan δ in excess of 0.1 across this same band. Taken as a whole, this data indicates that the composite possesses extremely high damping performance, in a form which is inherently stable with respect to cold flow.

EXAMPLE 4

Figure 30:
FIG. 30 is a scanning electron micrograph showing the structure of the NOMEX non-woven felt used in the fabrication of composite Examples 4–5. Notice that the structure is comprised of interconnected polymer fibers, which form a tortuous internal network.
Figure 31:
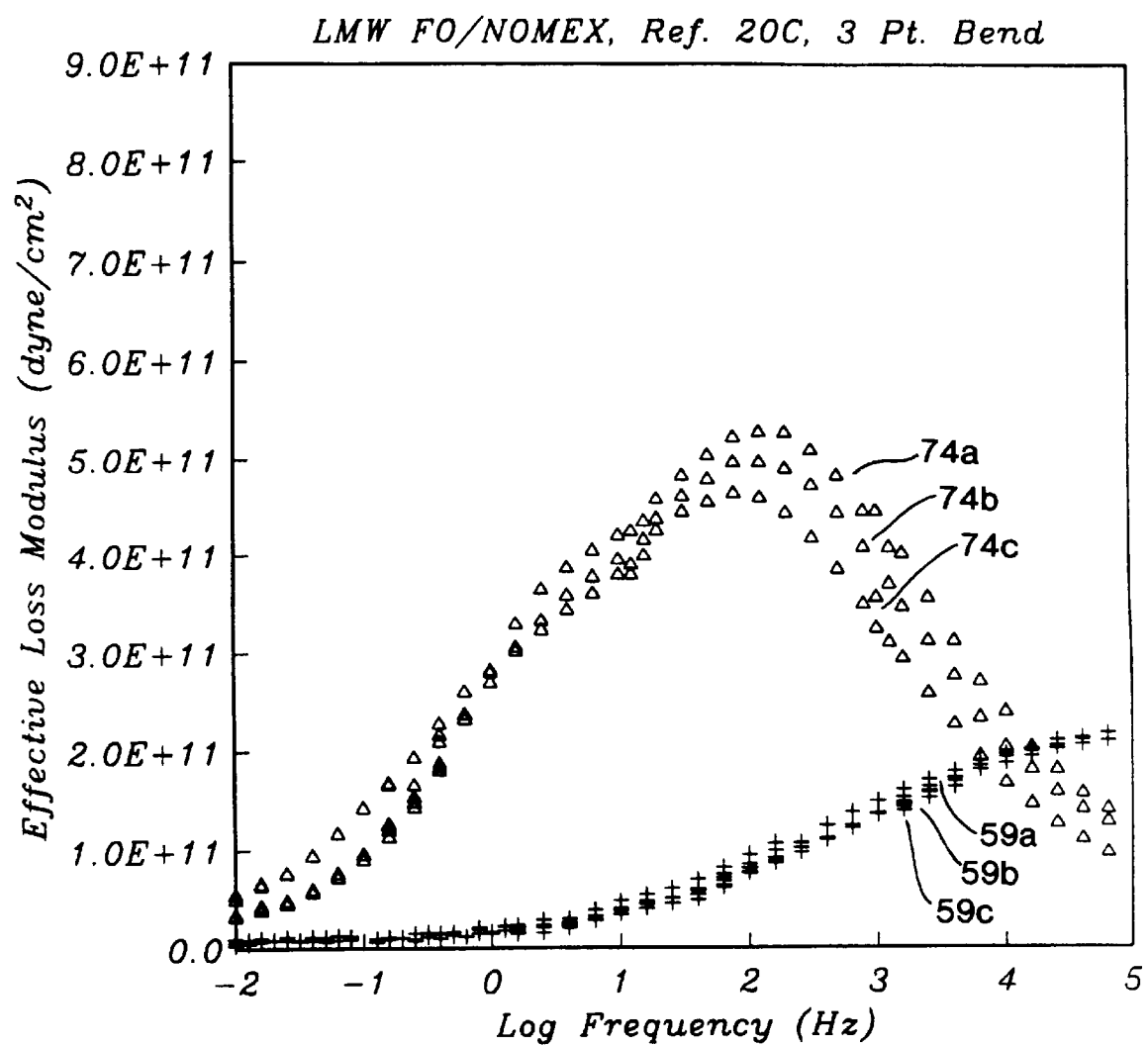
FIG. 31 shows time-temperature master curves at a reference temperature of 20° C., constructed using analysis method number 1, for effective dynamic loss modulus for the steel beam bonded system, measured using test method number 1. Shown are three replicate master curves for the composite material comprised of NOMEX felt and the low molecular weight version of a fluoro-oligomer, and three replicate master curves for a commercially available acrylic copolymer material.
Figure 32:
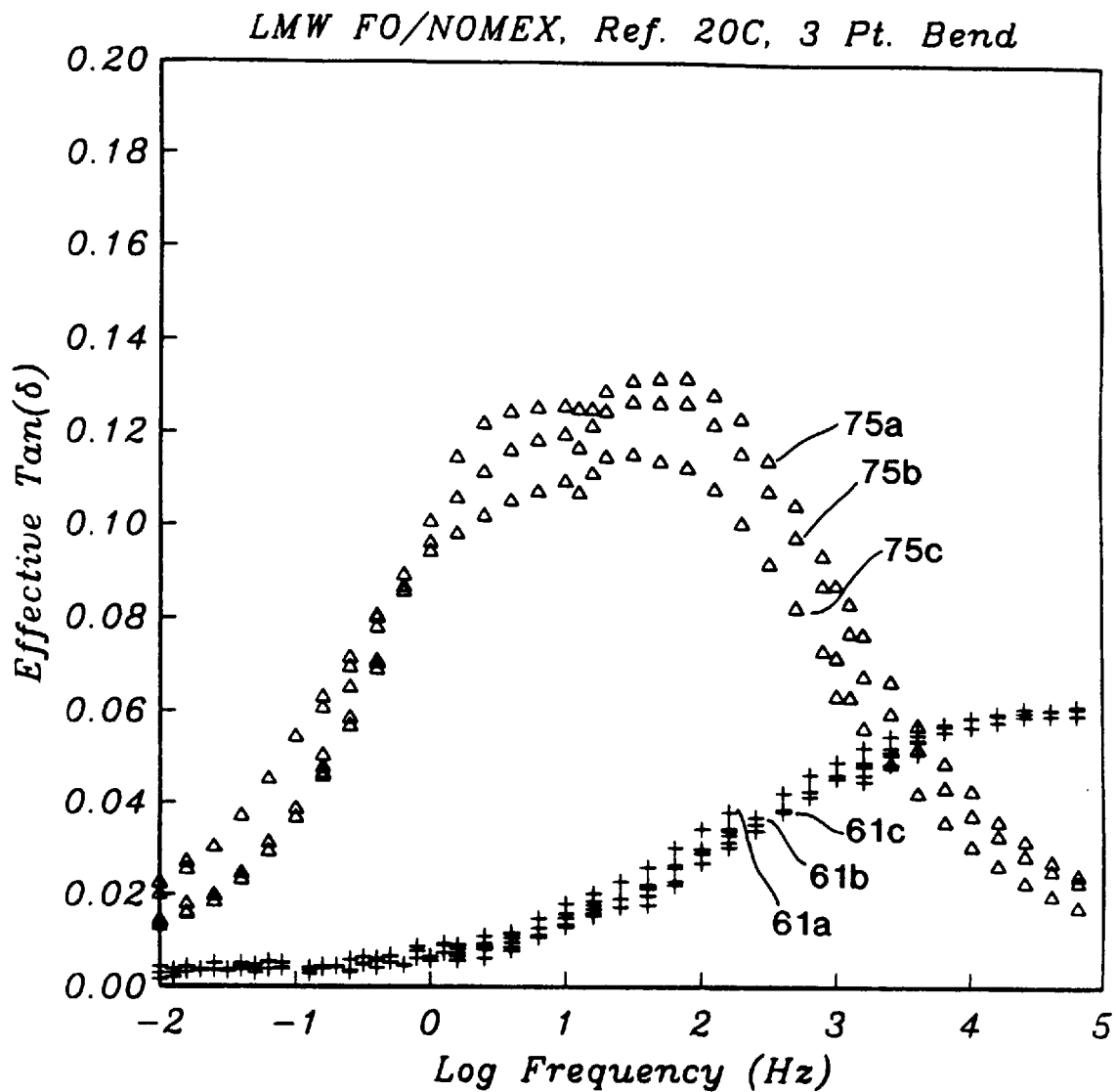
FIG. 32 shows time-temperature master curves at a reference temperature of 20° C., constructed using analysis method number 1, for effective tan δ for the steel beam bonded system, measured using test method number 1. Shown are three replicate master curves for the composite material comprised of NOMEX felt and the low molecular weight version of a fluoro-oligomer, and three replicate master curves for a commercially available acrylic copolymer material.
Figure 33:
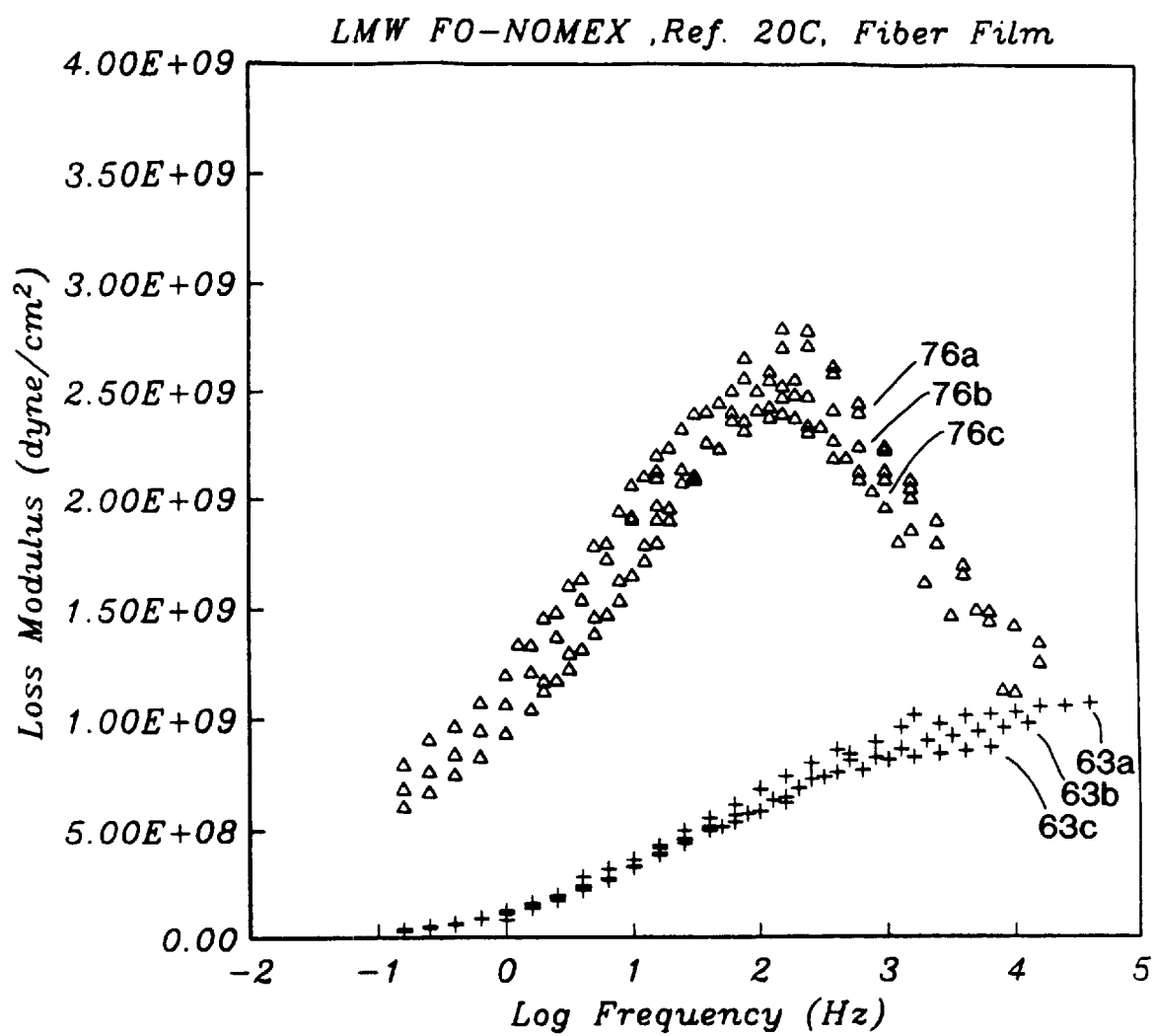
FIG. 33 shows time-temperature master curves at a reference temperature of 20° C., constructed using analysis method number 1, for dynamic loss modulus in fiber film geometry, measured using test method number 2. Shown are three replicate master curves for the composite material comprised of NOMEX felt and the low molecular weight version of a fluoro-oligomer, and three replicate master curves for a commercially available acrylic copolymer material.
Figure 34:
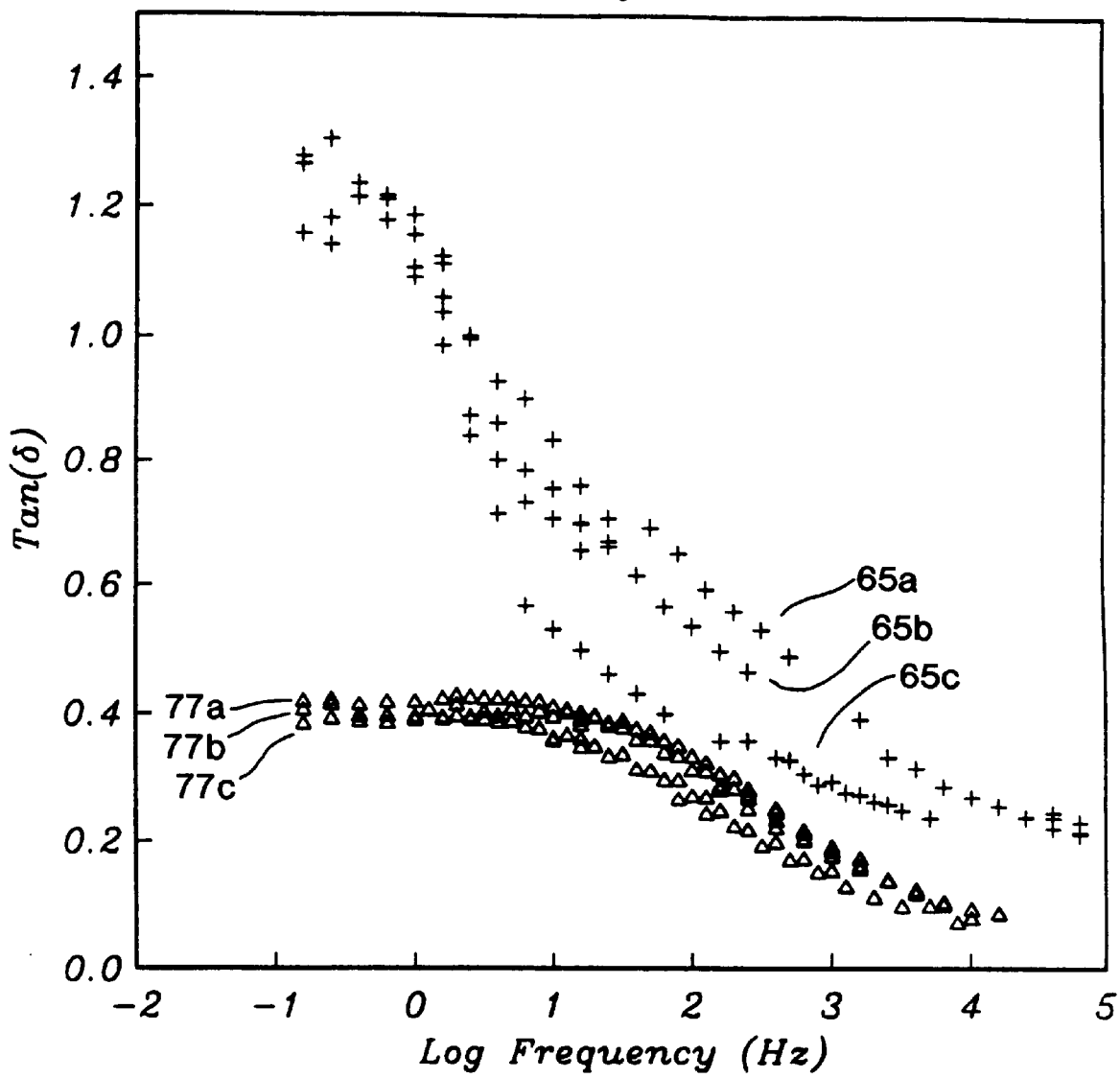
FIG. 34 shows time-temperature master curves at a reference temperature of 20° C., constructed using analysis method number 1, for tan δ in fiber film geometry, measured using test method number 2. Shown are three replicate master curves for the composite material comprised of NOMEX felt and the low molecular weight version of a fluoro-oligomer, and three replicate master curves for a commercially available acrylic copolymer material.

Having demonstrated the ability to stabilize a wide variety of unstable damping materials in a composite construct with microporous ePTFE, it is now shown that such composites may be fabricated using other porous polymer scaffolds. For this purpose, a thick non-woven fabric felt, sold under the trade name of NOMEX by E.I. DuPont de Nemours Co., was chosen. This felt, consisting of aromatic polyamide fibers, is not microporous, but possesses a complex porous structure well suited to retention of wetting fluids. FIG. 30 shows a scanning electron micrograph of the complex porous structure of NOMEX. The NOMEX felt employed as a scaffold in this example was measured to possess an average bulk density of 0.309 g/cc (average of 6 replicates, standard deviation of 0.00708 g/cc), and an average thickness of 1.712 mm (average of 6 replicates, standard deviation of 0.00753 mm), yielding an average unit weight of $5.29 \times 10^{-2}$ g/cm$^2$.

To provide a direct comparison of the performance of this scaffold with the ePTFE scaffold of example number 1, the NOMEX material was imbibed with the same lot of fluorooligomer as was used in the fabrication of that example. Since the oligomer easily wets the NOMEX fabric, the same procedure was used to produce a composite material as was employed to create Example 1. The final composite was measured to possess an average bulk density of 1.769 grams/cc (average of 6 replicates, standard deviation of 0.0450 g/cc), an average thickness of 2.18 mm (average of 6 replicates, standard deviation of 0.039 mm), yielding an average unit weight of 0.385 g/cm$^2$.

The stability of this material was observed over long periods of time at ambient temperature (approximately 22° C.). No separation or flow of the oligomer was observed over a several month period. In addition, the stability of the material at elevated temperature (70° C.) was observed for 1 hour. No separation or other mechanical instability was observed. Analytically, the average mechanical droop displacement, as determined via test method number 4, was determined to be 0.48 mm (average of 2 replicates, standard deviation of 0.095 mm). This composite, therefore, is extremely mechanically stable and resistant to cold flow.

This material was tested using both the 3 point bending method and fiber film techniques of test methods 1 and 2, at exactly the same temperatures as those employed for the characterization of example 1. FIGS. 31 through 34 show the timetemperature master curves constructed from this data using analysis method 1, in comparison to the results for the 3M ISD110 material. (Note that in FIG. 31, lines 74a, 74b, and 74c show the effective E" for the material of this example; in FIG. 32, lines 75a, 75b, and 75c show the effective tan δ for the same material; in FIG. 33, lines 76a, 76b, and 76c show the E" for this material; and in FIG. 34, lines 77a, 77b, and 77c show the tan δ for the material of this example.) The general performance trends across the frequency band from 0.1 to 10,000 Hz are seen to be nearly identical to those of example 1, except that the present example yields approximately double the effective E" and approximately the same E" at a particular frequency. The reason for significantly improved effective E" values, relative to example 1, is unknown, since the absolute magnitudes of the fiber film testing, and relative loadings of the oligomer, appear similar. In any case, the example exhibits excellent damping performance, both when reduced to application on the steel beam in 3 point bending, and via fiber film. The composite outperforms the 3M ISD110 material well into the acoustic range, with effective dynamic loss modulus in excess of $2.0 \times 10^{11}$ dyne/cm$^2$ from 1 to $10^4$ Hz and corresponding effective tan δ in excess of 0.06 across the same band. Fiber film results demonstrate dynamic loss modulus in excess of $1.0 \times 10^9$ dyne/cm$^2$ and tan δ in excess of 0.1 across the same band. A high damping performance composite with excellent mechanical stability is thus demonstrated.

EXAMPLE 5

To further demonstrate the ability to stabilize different damping compounds using different scaffolds and damping components, a fifth composite material was fabricated using the same NOMEX scaffold employed in the previous example. Here, the viscoelastic damping material used in example number 3 (the DOW Chemical DEN438 epoxy resin), was stabilized within the matrix. This provides an example of stabilization of this same material with NOMEX, which may be compared to example number 3 which utilized ePTFE as a scaffold. The NOMEX felt employed for the purpose of this example was exactly the same material employed in the previous example.

Although the DEN438 epoxy resin will wet the NOMEX structure at high temperature, absorption into the matrix is generally poor, and it is difficult to obtain high uniform loadings by the simple techniques employed with the fluoro-oligomer. In order to facilitate better wetting, therefore, a low surface tension coating was first applied to the NOMEX fiber surfaces. This micron scale coating, although nearly insignificant from a mechanical standpoint, provided much improved wetting characteristics, allowing the coated NOMEX to be wetted with DEN438 using exactly the same procedure as employed with the oligomer in example number 4. The specific coating applied to the NOMEX prior to wetting with the epoxy is a hydrophilic polymer, tetrafluoroethylene-vinyl alcohol copolymer. This material is a hydrophilic coating on ePTFE membranes as described in U.S. Pat. No. 5,130,024. The final composite, wetted with Dow DEN438, was measured to possess an average bulk density of 1.15 g/cc (average of 6 replicates, standard deviation of $7.98 \times 10^{-3}$ g/cc), and an average thickness of 1.90 mm (average of 6 replicates, standard deviation of 0.0256 mm), to yield an average unit weight of 0.218 g/cm$^2$.

The stability of this composite was observed over long periods of time at ambient temperature (approximately 22° C.). No separation or flow of the oligomer was observed over a several month period. In addition, the stability of the material at elevated temperature (150° C.) was observed for 1 hour. No separation or other mechanical instability was observed. Analytically, the average mechanical droop displacement of the material, determined via test method number 4, was measured to be 0.39 mm (average of 2 replicates, standard deviation of $7.78 \times 10^{-2}$ mm). These results indicate that this material is extremely mechanically stable with respect to cold flow.

Figure 35:
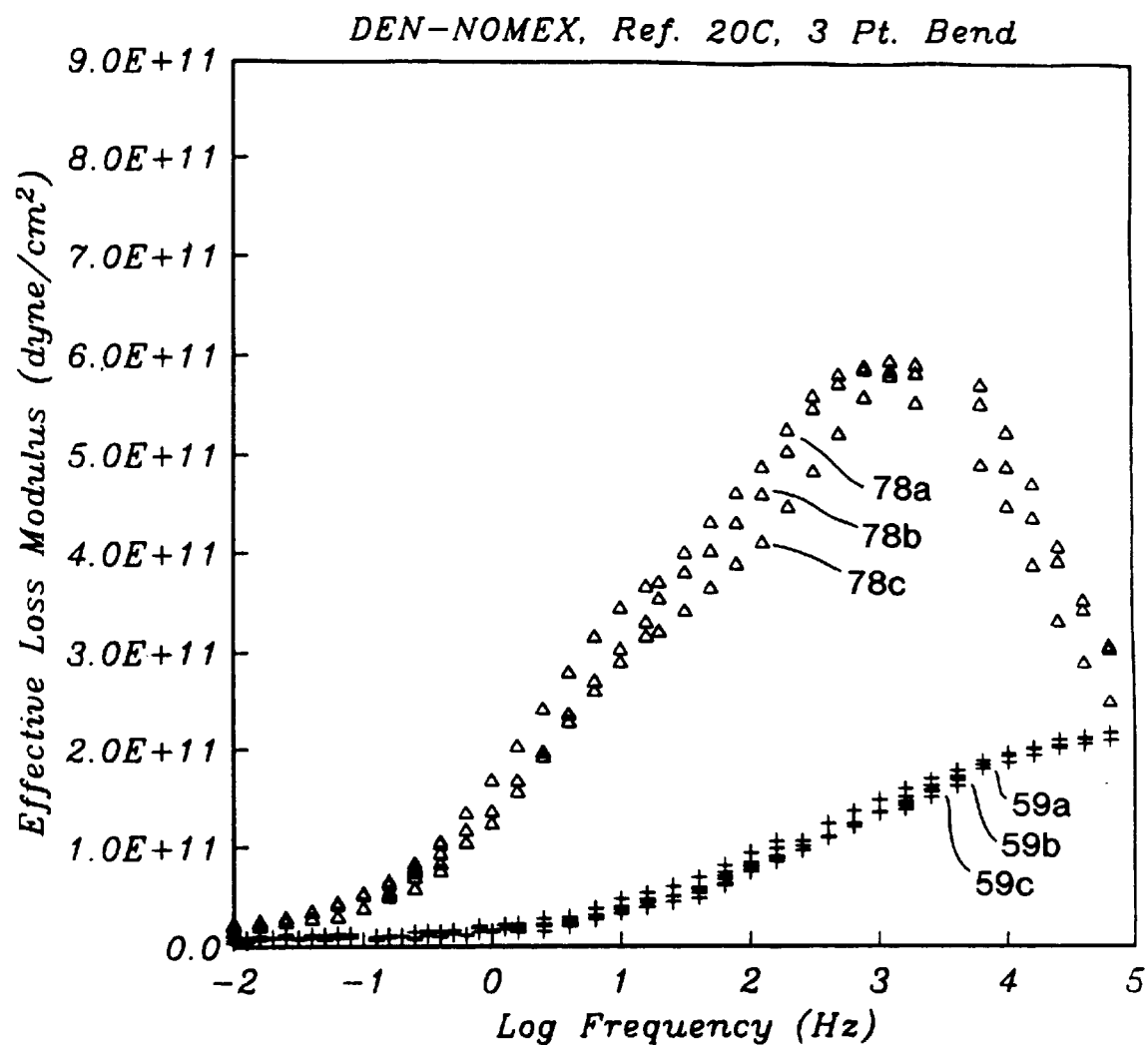
FIG. 35 is described in Example 5 and depicts time-temperature master curves at a reference temperature of 20° C., constructed using analysis method number 1, for effective dynamic loss modulus for the steel beam bonded system, measured using test method number 1. Shown are three replicate master curves for the composite material comprised of NOMEX felt and an epoxy resin, and three replicate master curves for a commercially available acrylic copolymer material.
Figure 36:
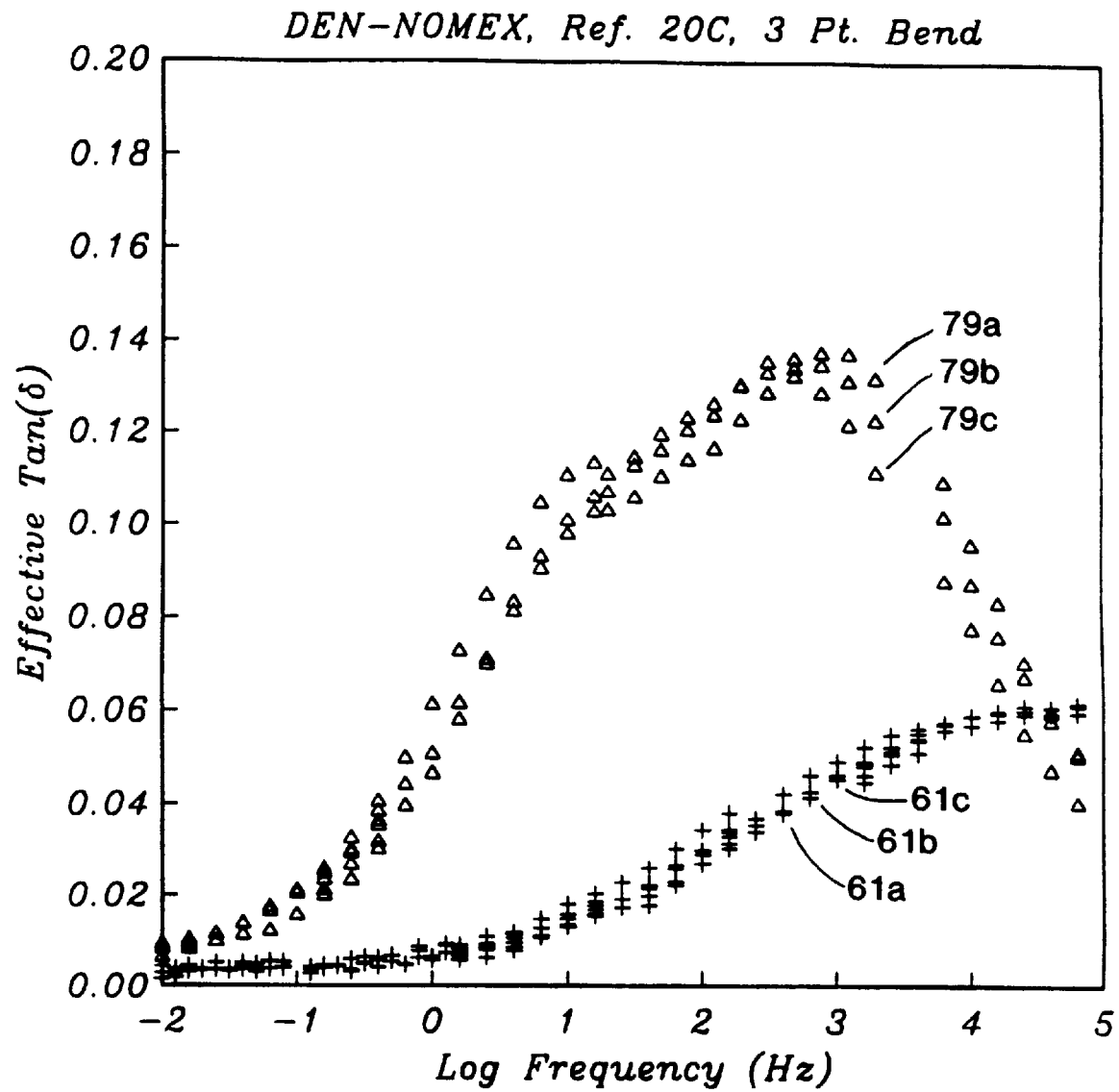
FIG. 36 shows time-temperature master curves at a reference temperature of 20° C., constructed using analysis method number 1, for effective tan δ for the steel beam bonded system, measured using test method number 1. Shown are three replicate master curves for the composite material comprised of NOMEX felt and an epoxy resin, and three replicate master curves for a commercially available acrylic copolymer material.
Figure 37:
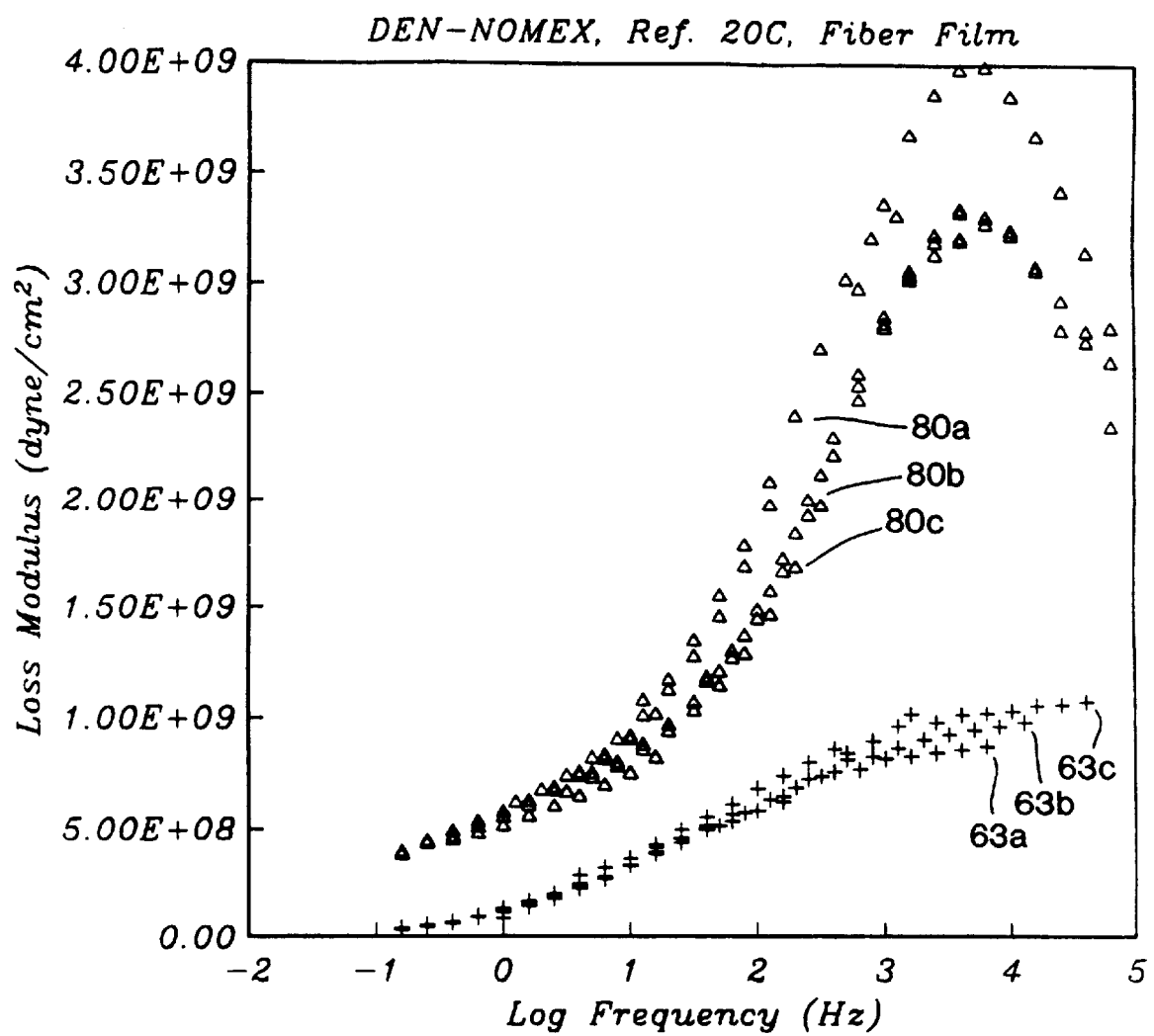
FIG. 37 shows time-temperature master curves at a reference temperature of 20° C., constructed using analysis method number 1, for dynamic loss modulus in fiber film geometry, measured using test method number 2. Shown are three replicate master curves for the composite material comprised of NOMEX felt and an epoxy resin, and three replicate master curves for a commercially available acrylic copolymer material.
Figure 38:
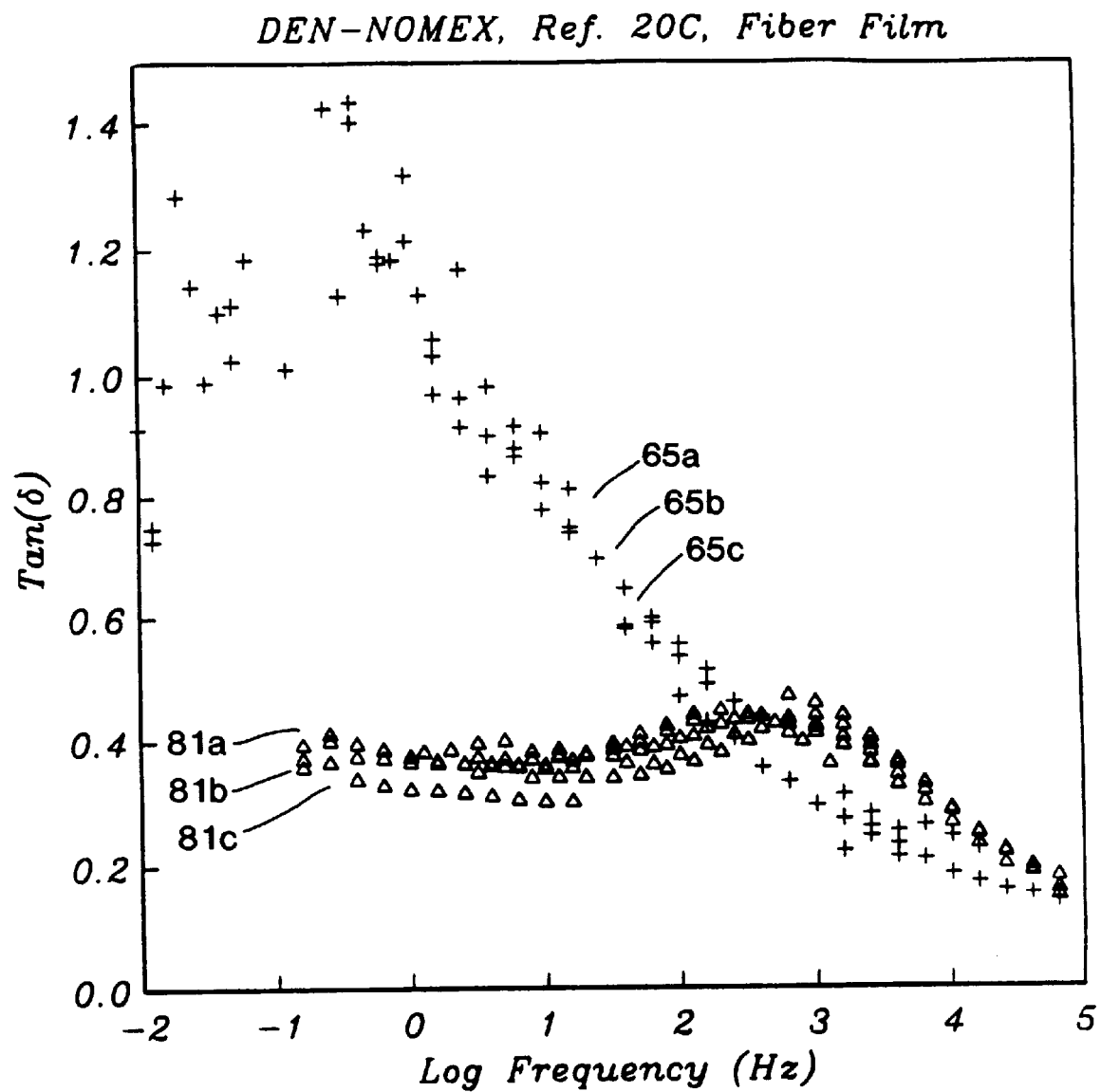
FIG. 38 shows time-temperature master curves at a reference temperature of 20° C., constructed using analysis method number 1, for tan δ in fiber film geometry, measured using test method number 2. Shown are three replicate master curves for the composite material comprised of NOMEX felt and an epoxy resin, and three replicate master curves for a commercially available acrylic copolymer material.

This composite was tested using both test methods 1 and 2 at exactly the same temperatures as those employed for the characterization of example 3. FIGS. 35 and 36 show the time-temperature master curves constructed from this data (shown in lines 78a, 78b, and 78c in FIG. 35; and in lines 79a, 79b, and 79c in FIG. 36) using analysis method 1, in comparison to the results for the 3M ISD110 material. FIG. 37, lines 80a, 80b, and 80c, and FIG. 38, lines 81a, 81b, and 81c, show the corresponding fiber film results. Generally, the results are very similar to those obtained for Example 3, aside from relatively minor differences presumably due to loading offsets and slight differences in bonding characteristics to the steel beams. Specifically, effective loss modulus is seen to be in excess of $2.0 \times 10^{11}$ dyne/cm$^2$, across the frequency band from 100 to $10^4$ Hz, with effective tan δ excess of 0.032 across the same band. Loss modulus, as determined via fiber film, exceeds $1.0 \times 10^9$ with corresponding tan δ excess of 0.3 across the same frequency band. A high damping performance composite, with excellent mechanical stability, is thus demonstrated.

We claim:
1. A composite damping material comprised of:
   a) a porous material, and
   b) at least one second material having a mechanical droop time of less than $10^4$ seconds,
said second material being within the pores of said porous material; and said composite having a mechanical droop displacement less than 1 mm, and having a dynamic loss modulus master curve value greater than $1 \times 10^9$ dyne/cm$^2$ at at least one point within the frequency band between 0.1 and $10^5$ Hz.

2. The composite damping material of claim 1 wherein the dynamic loss modulus master curve value is greater than $1.5 \times 10^9$ dyne/cm$^2$ at at least one point within the frequency band between 0.1 and $10^5$ Hz.

3. The composite damping material of claim 1 wherein the composite additionally has a tan δ master curve value of greater than 0.1 at at least one point within the frequency band between 0.1 and $10^5$ Hz.

4. The composite damping material of claim 3 wherein the dynamic loss modulus master curve value is greater than $1.5 \times 10^9$ dyne/cm$^2$ at at least one point within the frequency band between 0.1 and $10^5$ Hz.

5. The composite damping material of claim 1 wherein the second material has a mechanical droop time of less than 500 seconds, and the composite has a mechanical droop displacement no greater than 1.0 mm and a dynamic loss modulus master curve value greater than $1.5 \times 10^9$ dyne/cm$^2$ at at least one point within the frequency band between 0.1 and $10^5$ Hz.

6. The composite damping material of claim 5 wherein the composite additionally has a tan δ master curve value of greater than 0.1 at at least one point within the frequency band between 0.1 and $10^5$ Hz.

7. The composite damping material of claims 1, 2, 3, 4, 5 or 6 wherein the porous material is a polymer.

8. The composite damping material of claim 7 wherein the polymer is selected from a fluorinated polymer, a polyamide, a polyolefin, a chlorinated polymer or cellulose acetate.

9. The composite damping material of claim 8 wherein the polymer is a fluorinated polymer.

10. The composite damping material of claim 9 wherein the fluorinated polymer is polytetrafluoroethylene.

11. The composite damping material of claim 10 wherein the porous polytetrafluoroethylene is microporous.

12. The composite damping material of claim 1, 2, 3, 4, 5 or 6 wherein the porous material is selected from a ceramic, a glass or a metal.

13. The composite damping material of claim 1, 2, 3, 4, 5 or 6 wherein the second material is selected from the class consisting of epoxies, fluorocarbons, polyurethanes, acrylic polymers, silicones, and polyisobutylene.

14. The composite damping material of claim 13 wherein the second material is an oligomeric perfluorocarbon.

15. The composite damping material of claim 13 wherein the second material is an uncured novolac epoxy resin.

16. The composite damping material of claim 7 wherein the second material is an oligomeric perfluorocarbon or an uncured novalac epoxy resin.

17. The composite damping material of claim 9 wherein the second material is an oligomeric perfluorocarbon or an uncured novalac epoxy resin.

18. The composite damping material of claim 11, wherein the second material is an oligomeric perfluorocarbon or an uncured novalac epoxy resin.

19. The composite damping material of claim 12 wherein the second material is an oligomeric perfluorocarbon or an uncured novalac epoxy resin.

20. The composite damping material of claims 1, 2, 3, 4, 5 or 6 wherein either or both of the porous material or the second material contains a filler material.

21. The composite damping material of claim 1 wherein the porous material is microporous PTFE and the second material is an oligomeric fluorocarbon or an uncured novalac epoxy resin.

22. An article comprising a surface susceptible to vibration which has bonded to it a composition of claims 1, 2, 3, 4, 5, 6 or 21.

23. The article of claim 22 wherein the surface is part of a disc drive assembly.

24. The article of claim 22 wherein the surface is part of a vehicle or aircraft.

25. The article of claim 22 wherein the surface is a part of sporting equipment.

26. The article of claim 22 wherein the surface is part of an electric or electronic cable.

27. The article of claim 22 wherein the surface is part of a machining system.

* * * * *